US006160610A

United States Patent [19]

Toda

[11] Patent Number: 6,160,610

[45] Date of Patent: Dec. 12, 2000

[54] IMAGE FORMING DEVICE AND METHOD FOR CONTROLLING DIVISIONAL LIGHT SCANNING DEVICE

[75] Inventor: Tsuneo Toda, Saitama-ken, Japan

[73] Assignee: Fuji Xerox Co., Ltd., Japan

[21] Appl. No.: 09/192,503

[22] Filed: Nov. 17, 1998

[30] Foreign Application Priority Data

Nov. 18, 1997 [JP] Japan .................................... 9-317490

[51] Int. Cl.[7] ............................ G03B 27/52; B41J 2/455; B41J 2/45; B41J 2/47

[52] U.S. Cl. ............................ 355/41; 347/233; 347/238; 347/240

[58] Field of Search .............................. 355/41; 347/233, 347/238, 240

[56] References Cited

U.S. PATENT DOCUMENTS

| | | | |
|---|---|---|---|
| 4,799,082 | 1/1989 | Suzuki | 355/14 |
| 5,251,055 | 10/1993 | Koide | 359/216 |
| 5,294,959 | 3/1994 | Nagao et al. | 355/208 |
| 5,392,060 | 2/1995 | Imakawa | 347/240 |
| 5,481,337 | 1/1996 | Tsuchiya et al. | 355/208 |
| 5,724,087 | 3/1998 | Sugano et al. | 347/243 |
| 5,822,079 | 10/1998 | Okuno et al. | 358/300 |
| 5,926,203 | 7/1999 | Shimura et al. | 347/238 |
| 5,963,243 | 10/1999 | Hara et al. | 347/251 |
| 5,987,193 | 11/1999 | Eguchi et al. | 382/318 |

FOREIGN PATENT DOCUMENTS

| | | |
|---|---|---|
| 58-127912 | 7/1983 | Japan . |
| 63-47718 | 2/1988 | Japan . |
| 1-183676 | 7/1989 | Japan . |
| 3-98066 | 4/1991 | Japan . |

*Primary Examiner*—Russell Adams
*Assistant Examiner*—Khaled Brown
*Attorney, Agent, or Firm*—Finnegan, Henderson, Farabow, Garrett & Dunner, L.L.P.

[57] ABSTRACT

Plural linear marks extending along a scanning direction are spaced apart from each other at constant intervals and parallel to each other at a boundary of partial exposure ranges. When the marks are repeatedly formed by two light beams while a position of the mark formed by one of the two light beams is moved in the scanning direction, a density within a predetermined region corresponding to the boundary is changed so as to become lighter as the intervals between the marks are increased. When plural linear marks, which extend along the scanning direction and are spaced apart from each other at constant intervals and parallel to each other at a boundary portion of partial exposure ranges, are formed by two light beams while a position of the mark formed by one of the light beams is moved in a direction perpendicular to the scanning direction, a density within a predetermined region is changed so as to become lighter as an amount of offset is reduced. Accordingly, on the basis of a change in density within the predetermined region, it is possible to detect a case in which offset in beam irradiating positions in the scanning direction and the direction perpendicular to the scanning direction is zero. Offset of beam irradiating positions at the boundary can be controlled to be zero.

23 Claims, 17 Drawing Sheets

FIG. 12
AMOUNT OF OFFSET IN MAIN SCANNING DIRECTION
0
1 DOT
2 DOTS
3 DOTS
DENSITY WITHIN DENSITY DETECTING REGION

SUBSCANNING DIRECTION AMOUNT OF OFFSET = -2 LINES

SUBSCANNING DIRECTION AMOUNT OF OFFSET = -1 LINE

SUBSCANNING DIRECTION AMOUNT OF OFFSET = 0

SUBSCANNING DIRECTION AMOUNT OF OFFSET = +1 LINE

SUBSCANNING DIRECTION AMOUNT OF OFFSET = +2 LINES

IMAGE FORMING DEVICE AND METHOD FOR CONTROLLING DIVISIONAL LIGHT SCANNING DEVICE

BACKGROUND OF THE INVENTION

1. Field of the Invention

The present invention relates to an image forming device and a method for controlling a divisional light scanning device, and particularly relates to a method of controlling a divisional light scanning device for controlling a divisional light scanning device which scans respective light beams on an image carrier such that an exposure range on the image carrier is divided into plural partial exposure ranges in advance in accordance with plural light beams along a scanning direction of the light beams, and an optical scanning range of each light beam includes a corresponding partial exposure range and ranges from a boundary of this partial exposure range to a position spaced apart therefrom by a predetermined length along the aforementioned scanning direction. The present invention also particularly relates to an image forming device to which this method of controlling a divisional light scanning device can be applied.

2. Description of the Related Art

In general, in an image forming device such as a laser printer, a laser copying machine, or the like, a photosensitive body is charged by a charging means and a light beam is scanned on the photosensitive body by a light scanning device so that an electrostatic latent image is formed on the photosensitive body. A toner image is formed on the photosensitive body by developing the electrostatic latent image by a developing means. The toner image formed on the photosensitive body is transferred onto a transfer material so that an image is formed on the transfer material. Increasing the formable image size and increasing the image forming speed are always demanded of this type of image forming device. Accordingly, broadening of the scanning range (exposure range) of the light beam on the photosensitive body and increasing the scanning speed are required of the light scanning device.

However, when the scanning range of the light beam is widened in the light scanning device, a problem exists in that the optical member such as an $f^{\theta}$ lens or the like becomes larger so that the light scanning device itself becomes larger. Further, the scanning speed of the light beam can be increased by, for example, increasing the number of faces of a rotary polygon mirror for deflecting the light beam. However, when the number of faces of the rotary polygon mirror is increased the while the optical characteristics of the light scanning device are maintained, the rotary polygon mirror becomes larger, and thus, the load applied to a motor for rotating the rotary polygon mirror is increased. Therefore, problems such as windage loss, vibration, and the like are caused. The scanning speed of the light beam can also be increased by increasing the rotating speed of the rotary polygon mirror. However, a motor capable of rotating the rotary polygon mirror at high speed is expensive and a problem also exists in that vibrations are caused as the rotating speed is increased.

To solve the above problems, Japanese Patent Application Laid-Open (JP-A) No. 63-47718 proposes a divisional light scanning device in which the exposure range on the photosensitive body is divided into plural partial exposure ranges along a scanning direction of the light beam, and plural laser beams emitted from plural laser light sources are incident on a reflecting face of the rotary polygon mirror at different incident angles such that each of the laser beams scans only a corresponding partial exposure range on the photosensitive body, and a single image is formed by the plural laser beams by modulating each of the laser beams in accordance with a partial image to be formed in each partial exposure range. In accordance with this divisional light scanning device, the scanning range can be widened and the time required for one scan can be shortened, i.e., the scanning speed can be increased, without causing problems such as an increase in the size of the device, an increase in cost, generation of vibrations, or the like.

However, in the above-described divisional light scanning device, exposure is performed by separate light beams in units which are the partial exposure ranges. Therefore, at a joint of adjacent partial exposure ranges, irradiating positions of light beams for exposing both partial exposure ranges are often slightly offset from each other due to discrepancies in the assembly positions of the respective optical parts forming the scanning device, or the like. A double exposure portion irradiated by both of the light beams or a non-exposed portion not exposed by any light beam are continuously generated along the joint of the partial exposure ranges due to this offset in irradiating positions. Accordingly, a problem exists in that a striped pattern is formed at a portion corresponding to the joint of the partial exposure ranges on an image. Further, there is the fear that, due to this striped pattern, the image formed by using the above divisional light scanning device will be visually recognized as a collection of fragmentary partial images with the partial exposure range as a unit. Accordingly, there is the possibility that image quality will suffer greatly.

To solve this problem, Japanese Patent Application Laid-Open (JP-A) No. 58-127912 discloses a technique in which optical scanning ranges of a pair of light beams for exposing adjacent partial exposure regions are overlapped at the joint of the partial exposure ranges (the end portions of the optical scanning ranges of both light beams are set to be overlapped along a direction perpendicular to the scanning direction). The position of the joint of the partial exposure ranges formed by both light beams is set randomly within a region (hereinafter called a boundary region) in which the optical scanning ranges are overlapped. Thus, no striped pattern generated at the joint of the partial exposure ranges is apparently conspicuous.

In Japanese Patent Application Laid-Open (JP-A) No. 3-98066, by decreasing the exposure amount of one light beam and increasing the exposure amount of the other light beam in the same ratio in a boundary region which is formed by the pair of light beams and in which the light scanning ranges are overlapped in the boundary region, a total of exposure amounts of the pair of light beams in the boundary region is set to an average value not greatly different from an exposure amount in another exposure range (an exposure range which is other than the boundary region and which is exposed by a single light beam).

In the technique described in Japanese Patent Application Laid-Open (JP-A) No. 58-127912, the position of the joint of the partial exposure ranges formed by the light beams in the boundary region is set randomly so that the position of an end portion of a range actually exposed by each of the light beams varies randomly. Accordingly, when an image is to be formed on the photosensitive body, image data expressing the image to be formed must be divided into plural data in accordance with the position of the joint which is varying randomly, and each of the light beams must be modulated at a timing corresponding to the randomly-varying position of the joint by using the divided data.

Accordingly, a problem exists in that processing becomes very complicated. Further, when the position of the joint of the partial exposure ranges is periodically varied in order to simplify the processing, the image is periodically disturbed.

In the technique described in Japanese Patent Application Laid-Open (JP-A) No. 3-98066, the exposure amount in the boundary region can be averaged. However, the irradiating positions of the pair of light beams in the boundary region, in which the optical scanning ranges are overlapped, are slightly offset from each other, and thus, the image is blurry in the boundary region exposed by each of the pair of light beams. This bluriness is clearly visually recognized in particular when the resolution of the image to be formed is high. Accordingly, it is not preferable to apply this technique when an image is to be formed with high quality.

In each of the techniques described in the above publications, the offset in the irradiating positions of the light beams at the joint of the partial exposure ranges is made inconspicuous by varying the position of the joint or controlling the light amount. However, as mentioned above, problems exist in that processing becomes complicated and the image is disturbed or becomes blurry. Therefore, a technique for overcoming offset itself in the irradiating positions of the light beams at the joint of the partial exposure ranges is eagerly desired.

In connection with the above techniques, in Japanese Patent Application Laid-Open (JP-A) No. 1-183676, in an image forming device for forming a color image or the like by using plural light scanning devices, amounts of offset of the formed positions of the images of respective colors formed by the respective light scanning devices are detected by a CCD sensor. The scanning lines of the images of the respective colors, which are overlapped as a color image, are registered by adjusting an optical system or a synchronous system on the basis of the results of detection of the amounts of offset.

However, in the technique described in this publication, the position detection is performed by an expensive CCD sensor or the like to register the positions of the scanning lines. Further, the structure of the image forming device becomes complicated in order to control operations of the optical system and the synchronous system. Moreover, since it is necessary to perform complicated control, it takes time to perform processing. In addition, in the above publication, only registration in an image unit is disclosed, and there is no disclosure of how to register the irradiating positions of light beams at a joint of partial exposure ranges when the exposure range is divided into plural partial exposure ranges and each of the partial exposure ranges is exposed by a separate light beam.

SUMMARY OF THE INVENTION

In consideration of the above facts, an object of the present invention is to provide an image forming device capable of suppressing the generations of a stripe pattern and image disturbance at the boundary of partial exposure ranges by a simple structure and at a low cost, when an image is formed on an image carrier by exposing, by separate light beams, plural partial exposure ranges arranged along a scanning direction of the light beams.

Another object of the present invention is to provide, for a divisional light scanning device which exposes by separate light beams plural partial exposure ranges arranged along the scanning direction of the light beams, a method for controlling a divisional light scanning device which method allows the positional relationship of irradiating positions of light beams at a joint of partial exposure ranges to be easily controlled to an desired positional relationship.

To achieve the above object, an image forming device in accordance with a first aspect of a first invention comprises a divisional light scanning device in which an exposure range on an image carrier is divided in advance, in accordance with plural light beams respectively emitted from plural light sources and respectively deflected by deflecting means, into plural partial exposure ranges along a scanning direction of the light beams on the image carrier, and each of the light beams is scanned on the image carrier such that an optical scanning range of each of the light beams includes a corresponding partial exposure range and ranges from a boundary of partial exposure ranges to a position spaced apart therefrom by a predetermined length along the scanning direction, the image forming device being structured such that an image is formed on the image carrier by scanning each of the light beams on the image carrier and exposing each of the partial exposure ranges on the image carrier by the corresponding light beam, and the image forming device further comprising: image forming control means for forming a predetermined image on the image carrier by modulating each of the light beams; detecting means for detecting a density of the predetermined image within a predetermined region corresponding to the boundary of the partial exposure ranges, or a physical amount relating to the density; and control means for, on the basis of the density or the physical amount relating to the density detected by the detecting means, judging a positional relationship between irradiating positions at a boundary of partial exposure ranges of a pair of light beams which expose adjacent partial exposure ranges, and controlling the positional relationship such that the positional relationship becomes an desired positional relationship.

The image forming device in the first aspect has the divisional light scanning device in which the exposure range on the image carrier is divided in advance, in accordance with plural light beams respectively emitted from plural light sources and respectively deflected by the deflecting means, into plural partial exposure ranges along the scanning direction of the light beams on the image carrier, and each of the light beams is scanned on the image carrier such that the optical scanning range of each of the light beams includes a corresponding partial exposure range and ranges from the boundary of partial exposure ranges to a position spaced apart therefrom by a predetermined length along the scanning direction. An image is formed on the image carrier by scanning each of the light beams on the image carrier and exposing each of the partial exposure ranges on the image carrier by the corresponding light beam. Accordingly, the optical scanning ranges of a pair of light beams which expose adjacent partial exposure ranges which sandwich the boundary are overlapped along a direction perpendicular to the scanning direction of the light beams in a vicinity of the boundary of the partial exposure ranges.

The above image forming device is structured such that the image is formed by exposing the exposure range on the image carrier by the light beams in units which are the partial exposure ranges. Accordingly, on the formed image, densities in a portion corresponding to an exposure portion exposed by the light beams and a portion corresponding to an unexposed portion are different from each other. When the positional relationship of the irradiating positions of a pair of light beams which expose adjacent partial exposure ranges which sandwich the boundary is changed in a vicinity of the boundary of the partial exposure ranges (a region in which the optical scanning ranges of the pair of light beams overlap, hereinafter called "a boundary region"), the surface area of a region irradiated by the light beams within the boundary region changes so that the entire density within a predetermined region corresponding to the boundary region changes on the formed image.

Utilizing this, in the first aspect, the image forming control means forms a predetermined image on the image carrier by modulating each of the light beams. The detecting means detects a density of the predetermined image within a predetermined region corresponding to the boundary of the partial exposure ranges, or a physical amount relating to this density. On the basis of the density or the physical amount relating to this density detected by the detecting means, the control means judges the positional relationship of the irradiating positions on the boundary of the partial exposure ranges of a pair of light beams which expose adjacent partial exposure ranges. For example, the density within the predetermined region or the physical amount relating to the density can be detected by an inexpensive sensor such as a density sensor, a sensor similar to a density sensor, or the like. Accordingly, the positional relationship of the irradiating positions at the boundary of the partial exposure ranges of the pair of light beams can be judged on the basis of the density or a physical amount relating to the density detected by the detecting means, without performing a complicated processing such as detecting each irradiating position itself by using an expensive sensor such as a CCD sensor, or the like.

The control means controls the judged positional relationship such that this judged positional relationship becomes an desired positional relationship. The desired positional relationship may be a positional relationship in which no stripe pattern is generated on the boundary of the partial exposure ranges. For example, the positional relationship may be such that the irradiating positions at the boundary of the partial exposure ranges of the pair of light beams which expose adjacent partial exposure ranges are continuous along the scanning direction without any gaps or any overlapping. The positional relationship can be easily controlled to such a positional relationship by relatively changing, for the pair of light beams, the timing for starting or ending modulation of the light beams in accordance with an image to be formed on the basis of the judged positional relationship, or the like.

Accordingly, in accordance with the first aspect, when an image is formed on the image carrier by exposing by the separate light beams the plural partial exposure ranges which are arranged along the scanning direction of the light beams, it is possible to suppress generation of a stripe pattern and image disturbance at the boundary of the partial exposure ranges by a simple, in expensive structure.

The predetermined image formed by the image forming control means is preferably an image in which the density of the predetermined image within the predetermined region corresponding to the boundary of the partial exposure ranges, or a physical amount relating to the density, greatly varies in accordance with changes in the positional relationship between the irradiating positions at the boundary of the partial exposure ranges of a pair of light beams which expose the adjacent partial exposure ranges. As an example, as in a second aspect, the image forming control means can form a mark image alternately having low density portions and high density portions along the scanning direction or a direction perpendicular to the scanning direction within the predetermined region. Widths of the high density portions and low density portions in the mark image can be determined in consideration of the accuracy of judgment of the positional relationship of the irradiating positions of the light beams, the sensitivity characteristic of the detecting means, or the like. Thus, it is possible to more precisely judge the positional relationship of the irradiating positions at the boundary of partial exposure ranges of a pair of light beams which expose the adjacent partial exposure ranges.

When the sensitivity characteristic of the detecting means (the relationship between the change in a physical amount of a detected object and the change in output) is nonlinear and there is a low sensitivity region with respect to the change in a physical amount of the detected object, or the like, the image forming control means preferably controls sensitivity of the detecting means or the formation of the predetermined image such that the density of the predetermined image within the predetermined region or a value of the physical amount relating to the density corresponds to a high sensitivity region of the detecting means as in a third aspect. Thus, the output of the detecting means greatly changes in accordance with changes in a physical amount of the detected object (the density or a physical amount relating to the density). Accordingly, it is possible to more precisely judge the positional relationship of the irradiating positions at the boundary of partial exposure ranges of a pair of light beams which expose adjacent partial exposure ranges.

When the image forming device relating to the present invention has charging means for charging the image carrier and developing means for developing an electrostatic latent image formed on the image carrier by scanning each of the plural light beams on the image carrier, and the developing means transfers a toner image formed on the image carrier onto a recording material by developing the electrostatic latent image of the predetermined image so that the image is formed on the recording material, it is also possible to structure the detecting means such that the density within the predetermined region corresponding to the boundary of the partial exposure ranges is detected with, for example, the predetermined image formed on a recording material being the object. However, in this case, a recording material for transfer of the predetermined image is required each time the positional relationship of the irradiating positions of the light beams is controlled.

Therefore, in a fourth aspect, the image forming device in the first aspect further comprises charging means for charging the image carrier; and developing means for developing an electrostatic latent image formed on the image carrier by scanning each of the plural light beams on the image carrier, herein said detecting means detects, as the density of the predetermined image, a density, within said predetermined region, of a toner image formed on the image carrier by the developing means developing the electrostatic latent image of the predetermined image.

In the fourth aspect, the density, within the predetermined region, of the toner image formed on the image carrier by developing the electrostatic latent image of the predetermined image is detected. Accordingly, the density within the predetermined region can be detected without using a recording material for transfer of the predetermined image. For example, a density sensor can be used as the detecting means of the fourth aspect.

The following structure can be also adopted as the detecting means in the present invention. Namely, a fifth aspect is characterized in that the image forming device in the first aspect further comprises charging means for charging the image carrier, wherein said detecting means detects, as the physical amount relating to the density of the predetermined image, an electric potential, within said predetermined region, of an electrostatic latent image of the predetermined image formed on the image carried by each of the plural light beams being scanned on the image.

In the fifth aspect, the electric potential, within the predetermined region, of the electrostatic latent image of the predetermined image formed on the image carrier by scanning each of the plural light beams on the image carrier is detected. Accordingly, similarly to the fourth aspect, a physical amount relating to the density within the predetermined region can be detected without using a recording material for transfer of the predetermined image. For example, an electric potential sensor can be used as the detecting means of the fifth aspect.

The control means can judge the positional relationship of the irradiating positions at the boundary of partial exposure ranges of a pair of light beams which expose adjacent partial exposure ranges, as follows for example. Namely, a sixth aspect is characterized in that the control means in the first aspect changes the positional relationship, along the scanning direction or a direction perpendicular to the scanning direction, between irradiating positions of the light beams at the boundary of the partial exposure ranges, and on the basis of a change in the density or in the physical amount relating to the density detected by the detecting means at a time the positional relationship is changed, said control means judges whether the positional relationship, along the scanning direction or the direction perpendicular to the scanning direction, between the irradiating positions of the light beams at the boundary of the partial exposure ranges is the desired positional relationship.

In the sixth aspect, for a pair of light beams which expose adjacent partial exposure ranges, the positional relationship, along the scanning direction or the direction perpendicular to the scanning direction, between the irradiating positions of the light beams at the boundary of the partial exposure ranges is changed. The changing of the positional relationship, along the scanning direction, of the irradiating positions of the light beams at the boundary of the partial exposure ranges can be realized by, for a pair of light beams which expose adjacent partial exposure ranges, relatively changing the timing for starting or ending modulation of the light beams for forming an image in each scan, as in the seventh aspect for example.

The changing of the positional relationship, along the direction perpendicular to the scanning direction, of the irradiating positions of the light beams at the boundary of the partial exposure ranges can be realized by, for a pair of light beams which expose adjacent partial exposure ranges, relatively changing, by a unit which is the time required for one scan of the light beams, the timing for starting or ending modulation of the light beams for forming an image, as in the eighth aspect for example.

The image forming device relating to the present invention further comprises storing means for storing image data expressing an image to be formed, with the image data expressing the image to be formed being divided into partial image data each expressing a partial image to be formed in each of the partial exposure ranges. In a case in which the control means reads the partial image data corresponding to each of the light sources from the storing means with respect to each of the plural light sources and controls driving of each of the light sources such that the light beams are modulated in accordance with the read partial image data, the changing of the positional relationship, along the direction perpendicular to the scanning direction, of the illuminating positions of the light beams at the boundary of the partial exposure ranges can be realized by, for a pair of light beams which expose adjacent partial exposure ranges, relatively changing, by a nit which is an address difference corresponding to an image data amount used in one scan of the light beams, a read address at the time of reading of the partial image data corresponding to both of the light beams, as in the ninth aspect for example.

For example, when the positional relationship, along the scanning direction or the direction perpendicular to the scanning direction, between the irradiating positions of the light beams at the boundary of the partial exposure ranges is gradually changed, the slope of the change in the density of the predetermined region or a physical amount relating to the density with respect to a change in the positional relationship changes with, as a boundary, the time of the irradiating positions along the scanning direction of the pair of light beams coincide with each other at the boundary.

As shown in FIG. 1A as an example, an exposure range on the peripheral surface of a cylindrical image carrier is divided into two partial exposure ranges in accordance with two light beams (light beams A and B). The optical scanning ranges of the light beams A and B include corresponding partial exposure ranges. Further, the light beams A and B are scanned on the peripheral surface of the image carrier such that end portions of these optical scanning ranges are overlapped along a direction perpendicular to the scanning direction at a boundary of the partial exposure ranges (refer to the portion surrounded by the phantom line in FIG. 1A). This case will next be explained.

Here, as shown in FIG. 1B, a mark image is formed by each of light beams A and B at a boundary portion of the partial exposure ranges. The mark image is formed such that plural linear marks extending along the scanning direction are spaced apart from each other at constant intervals and are parallel to each other. When forming positions of the mark images formed by both of the light beams (irradiating positions of the light beams for forming the mark images) are relatively moved along the scanning direction (see the arrow in FIG. 1B), the density of a predetermined region (for example, the range surrounded by the broken line in FIG. 1B) corresponding to the boundary of the partial exposure ranges varies as shown in FIG. 1C. From FIG. 1C, it can be understood that the slope of the change in density within the predetermined region, at the time the positional relationship between the irradiating positions of the light beams along the scanning direction is varied (i.e., the amount of offset between the irradiation positions along the scanning direction is varied), is clearly different at the time when there is a gap between the mark images and at the time when the mark images overlap each other, i.e., is clearly different at either side of a boundary which if the time when the positions of the end portions along the scanning direction of the mark images coincide with one another (that is, the time when the amount of offset in the irradiating positions along the scanning direction is zero).

In FIG. 1D, mark images are formed by the light beams A and B in a boundary portion of the partial exposure ranges such that these mark images are overlapped along a direction perpendicular to the scanning direction. Each of these mark images is formed such that plural linear marks extending along the scanning direction are spaced apart from each other at constant intervals and are parallel to each other. For example, when forming positions of the mark images formed by both of the light beams are relatively moved along the direction perpendicular to the scanning direction by a unit which is a distance sufficiently smaller than the interval of the marks, the density within the predetermined region is changed as shown in FIG. 1E.

From FIG. 1E, it can be understood that the sign of the slope of the change in density within the predetermined region, at the time the positional relationship between the irradiating positions of the light beams along the direction perpendicular to the scanning direction is varied (i.e., the amount of offset between the irradiating positions along the direction perpendicular to the scanning direction is varied), is reversed at either side of a boundary which is the time when the positions of the mark images along the direction perpendicular to the scanning direction coincide with one another (that is, the time when the amount of offset of the irradiating positions along the direction perpendicular to the scanning direction is zero). On the basis of the above description, the control means of the sixth aspect is characterized by changing, for a pair of light beams which expose adjacent partial exposure ranges, the positional relationship, along the scanning direction or a direction perpendicular to the scanning direction, between the irradiating positions of the light beams at the boundary of the partial exposure ranges, and on the basis of a change in the density or in the physical amount relating to the density detected by the detecting means at a time the positional relationship is changed, the control means judges whether the positional relationship, along the scanning direction or the direction perpendicular to the scanning direction, between the irradiating positions of the light beams at the boundary of the partial exposure ranges is an desired positional relationship. Accordingly, in accordance with the sixth aspect, it is possible to judge with high accuracy whether the positional relationship, along the scanning direction or the direction perpendicular to the scanning direction, of the irradiating positions of the light beams at the boundary of the partial exposure ranges is the desired positional relationship.

A tenth aspect is characterized in that the image forming device in the first aspect further comprises timing means for measuring time, wherein each time it is detected that a predetermined time has passed on the basis of the time measured by the timing means, the image forming control means forms the predetermined image on the image carrier, and the detecting means detects the density or the physical amount relating to the density, and the control means controls the positional relationship between the irradiating positions of the light beams at the boundary of the partial exposure ranges such that the positional relationship becomes the desired positional relationship.

In the tenth aspect, each time it is detected that the predetermined time has passed, the predetermined image is formed on the image carrier, and the density or a physical amount relating to the density is detected, and the positional relationship of the irradiating positions of the light beams at the boundary of the partial exposure ranges is controlled so as to become the desired positional relationship. Accordingly, even when there is some sort of change in the optical parts forming the light beam scanning device over the passage of time (for example, a shift in position or the like), the positional relationship between the irradiating positions at the boundary of the partial exposure ranges of a pair of light beams which expose adjacent partial exposure ranges is controlled to become an desired positional relationship. Accordingly, in accordance with the tenth aspect, the positional relationship of the irradiating positions at the boundary of the partial exposure ranges of a pair of light beams which expose adjacent partial exposure ranges can be maintained at an desired positional relationship regardless of changes over time, such as a shift in position or the like of the optical parts forming the light beam scanning device which is caused by effects such as changes in the ambient temperature or the like.

An eleventh aspect is characterized in that the image forming device in the first aspect further comprises temperature detecting means temperature, wherein each time it is detected that a predetermined temperature change has arisen, the image forming control means forms the predetermined image on the image carrier, and the detecting means detects the density or the physical amount relating to the density, and the control means controls the positional relationship of the irradiating positions of the light beams at the boundary of the partial exposure ranges such that the positional relationship becomes the desired positional relationship.

In the eleventh aspect, each time it is detected that the predetermined temperature change has arisen, the predetermined image is formed on the image carrier, and the density or a physical amount relating to the density is detected, and the positional relationship between the irradiating positions of the light beams at the boundary of the partial exposure ranges is controlled to become the desired positional relationship. Accordingly, even when there is a shifting of the position or the like of the optical parts forming the light beam scanning device due to changes in ambient temperature, the positional relationship between the irradiating positions at the boundary of the partial exposure ranges of a pair of light beams which expose adjacent partial exposure ranges is controlled so as to become the desired positional relationship. Accordingly, in accordance with the eleventh aspect, the positional relationship of the irradiating positions at the boundary of the partial exposure ranges of a pair of light beams which expose adjacent partial exposure ranges can be maintained at the desired positional relationship regardless of shifts in positions or the like of the optical parts due to changes in the ambient temperature.

In a method of controlling a divisional light scanning device in a second invention, an exposure range on an image carrier is divided in advance, in accordance with plural light beams respectively emitted from plural light sources and respectively deflected by deflecting means, into plural partial exposure ranges along a scanning direction of the light beams on the image carrier, and each of the light beams is scanned on the image carrier such that an optical scanning range of each of the light beams includes a corresponding partial exposure range and ranges from a boundary of partial exposure ranges to a position spaced apart therefrom by a predetermined length along the scanning direction, the control method being such that a predetermined image is formed on the image carrier by modulating each of the light beams; a density of the predetermined image within a predetermined region corresponding to the boundary of the partial exposure ranges, or a physical amount relating to the density, is detected; and the positional relationship between irradiating positions at the boundary of the partial exposure ranges of a pair of light beams which expose adjacent partial exposure regions is judged on the basis of the detected density or the detected physical amount relating to the density, and the positional relationship is controlled so as to become an desired positional relationship.

In the second invention, a predetermined image is formed on the image carrier by modulating each of the light beams which are respectively emitted from the plural light sources and respectively deflected by the deflecting means and scanned on the image carrier. The density of the predetermined image within the predetermined region corresponding to the boundary of the partial exposure ranges, or a physical amount relating to the density, is detected. The positional relationship between the irradiating positions at the boundary of the partial exposure ranges of a pair of light beams which expose adjacent partial exposure ranges is judged on the basis of the detected density or the detected physical amount relating to the density. The positional relationship is controlled so as to become the desired positional relationship. Accordingly, in a manner similar to the first aspect of the first invention, the positional relationship can be judged on the basis of the density of the predetermined image within the predetermined region or the physical amount relating to the density, without performing complicated processing such as detecting the irradiating positions by using an expensive sensor such as a CCD sensor, or the like. For a divisional light scanning device which exposes, by separate light beams, the plural partial exposure ranges arranged along the scanning direction of the light beams, the positional relationship between irradiating positions of the light beams at a joint of the partial exposure ranges can be easily controlled to an desired positional relationship.

BRIEF DESCRIPTION OF THE DRAWINGS

FIGS. 1A to 1E are views for explaining operation of the present invention in which FIG. 1A is a perspective view showing an optical scanning range when an image is formed by two light beams, FIG. 1B is a plan view showing one example of mark images when irradiating positions of light beams are changed relatively along a scanning direction, FIG. 1C is a diagram showing a change in density within a predetermined region when the irradiating positions of the light beams are changed relatively along the scanning direction, FIG. 1D is a plan view showing one example of mark images when irradiating positions of the light beams are changed relatively along a direction perpendicular to the scanning direction, and FIG. 1E is a diagram showing a change in density within a predetermined region when the irradiating positions of the light beams are changed relatively along a direction perpendicular to the scanning direction.

DESCRIPTION OF THE PREFERRED EMBODIMENTS

Figure 2:
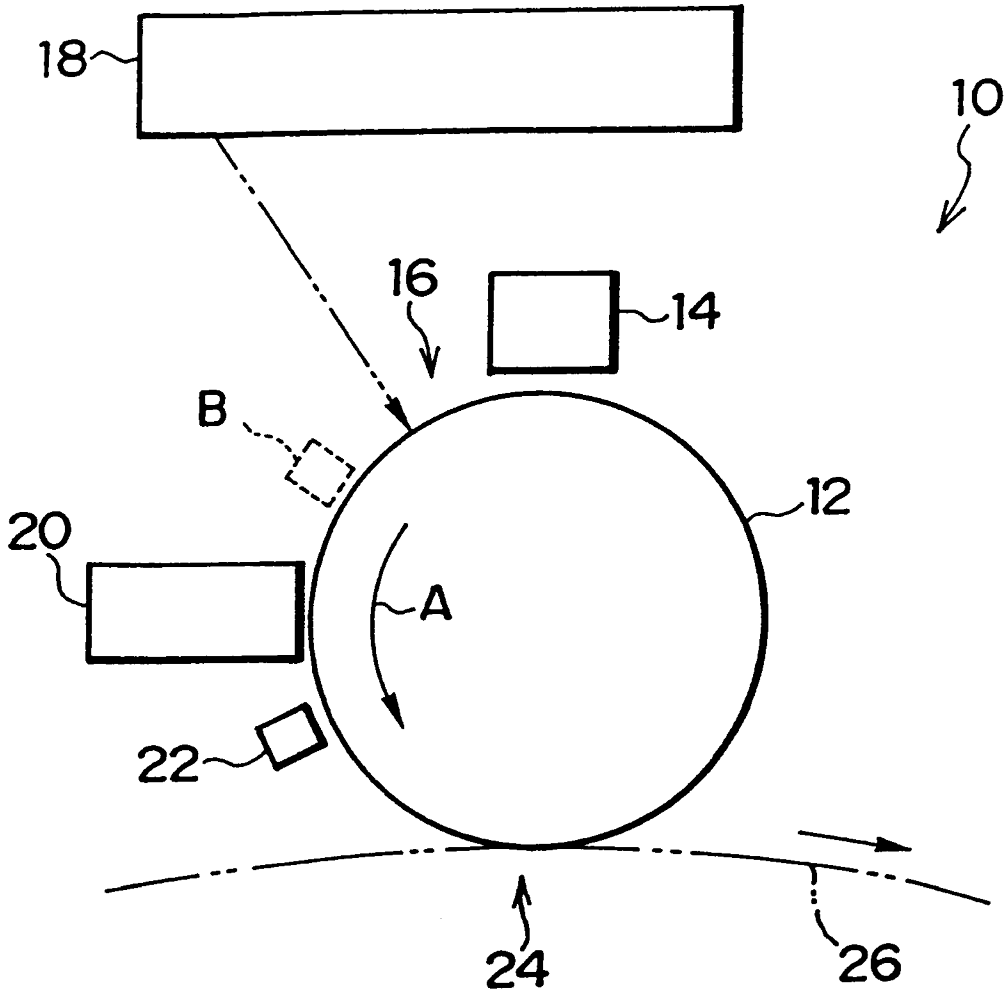
FIG. 2 is a view showing the schematic structure of an image forming device in accordance with an embodiment of the present invention.

One example of an embodiment of the present invention will next be described in detail with reference to the drawings. FIG. 2 shows the schematic structure of an image forming device 10 in accordance with the present embodiment. The image forming device 10 has a cylindrical photosensitive body drum 12 as an image carrier. An insulating photoconductive layer is formed on the peripheral surface of the photosensitive body drum 12. The photosensitive body drum 12 is rotated by an unillustrated driving means in the direction of arrow A in FIG. 2.

A charger 14 for charging the photosensitive body drum 12 is disposed at a predetermined region (the upper side) of the outer periphery of the photosensitive body drum 12. The charger 14 is connected to a control section 30 (see FIG. 5) and operation of the charger 14 is controlled by the control section 30. The charger 14 corresponds to the charging means recited in claims 4 and 5. An exposure section 16 is disposed at a downstream side of the charger 14 along a rotating direction of the photosensitive body drum 12. A divisional light scanning device 18 is provided in correspondence with this exposure section 16. The divisional light scanning device 18 will be described in detail later. In the divisional light scanning device 18, two light beams modulated in accordance with an image to be formed on a recording sheet are irradiated onto the peripheral surface of the photosensitive body drum 12 and are scanned on the peripheral surface of the photosensitive body drum 12 so that an electrostatic latent image of the image to be formed is formed on the peripheral surface of the photosensitive body drum 12.

A developing device 20 is disposed at a downstream side of the exposure section 16 along the rotating direction of the photosensitive body drum 12. The developing device 20 supplies toner to the peripheral surface of the photosensitive body drum 12 and develops the electrostatic latent image formed on the photosensitive body drum 12 so that a toner image of the image to be formed is formed on the peripheral surface of the photosensitive body drum 12. The developing device 20 is connected to the control section 30 (see FIG. 5)

and operation of the developing device 20 is controlled by the control section 30. The developing device 20 corresponds to the developing means recited in claim 4.

A density sensor 22 is disposed at a downstream side of the developing device 20 along the rotating direction of the photosensitive body drum 12. The density sensor 22 detects the density of a toner image (toner density) in a density detecting region corresponding to the boundary of partial exposure ranges on the peripheral surface of the photosensitive body drum 12. For example, a reflection-type density sensor which irradiates light to the density detecting region and detects the amount of reflected light by a photoelectric converting element such as a photodiode can be used as the density sensor 22. The density sensor 22 corresponds to the detecting means of the present invention (the detecting means is described in claim 4 in further detail), and is connected to the control section 30 through an amplifier 32 and an A/D converter 34 (see FIG. 5).

The suitable size of the density detecting region varies in accordance with the type of the density sensor 22, the positional relationship between the density sensor 22 and the photosensitive body drum 12, and the like. In the present embodiment, the divisional light scanning device 18 is designed such that the length of an overlap region (described later) along a main scanning direction is 3 mm. Accordingly, the density detecting region is a square region having a size of 3 mm x 3 mm.

A transfer section 24 is disposed at a predetermined region (a lower side) of the outer periphery of the photosensitive body drum 12. A recording sheet 26 serving as an image forming medium is fed into the transfer section 24. The transfer section 24 transfers the toner image formed on the peripheral surface of the photosensitive body drum 12 onto the recording sheet 26. The recording sheet 26 onto which the toner image has been transferred by the transfer section 24 is fed to an unillustrated fixing section. Thus, the toner image transferred onto the recording sheet 26 is fixed so that the image is formed on the recording sheet 26.

Figure 3:
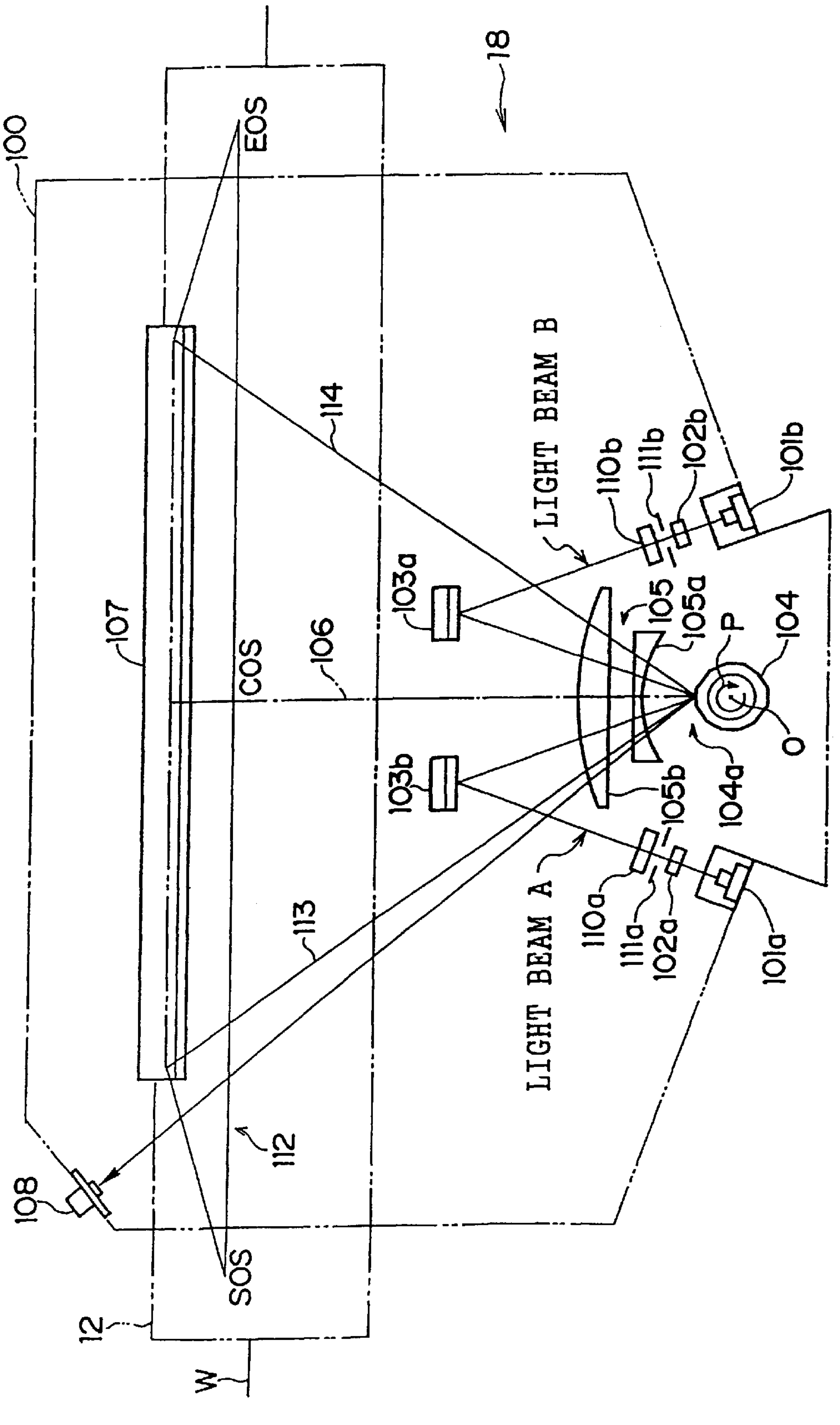
FIG. 3 is a plan view showing the schematic structure of a light beam scanning device.

The divisional light scanning device 18 will next be explained. As shown in FIG. 3, the divisional light scanning device 18 is structured such that various kinds of optical parts are housed within a box body 100. The divisional light scanning device 18 has two laser diodes (LDs) 101*a*, 101*b* serving as plural light sources in the present invention. The LDs 101*a*, 101*b* are disposed at left and right symmetrical positions with respect to a central line 106 showing the center of a scanning range of a light beam scaned by a polygon mirror 104 which will be described later. The LDs 101*a*, 101*b* are respectively connected to the control section 30 through LD drivers 109*a*, 109*b* (see FIG. 5). The LD drivers 109*a*, 109*b* modulate and drive the LDs 101*a*, 101*b* in accordance with an image to be formed on the recording sheet 26. Thus, a light beam modulated in accordance with the image to be formed is emitted from each of the LDs 101*a*, 101*b*. In the following description, the light beam emitted from the LD 101*a* is called "light beam A" and the light beam emitted from the LD 101*b* is called "light beam B" so as to differentiate these light beams from each other.

Collimator lenses 102*a*, 102*b*, which make the laser beams emitted from the LDs 101*a*, 101*b* into substantially parallel light beams, slits 111*a*, 111*b* for beam shaping, and cylindrical lenses 110*a*, 110*b* are disposed in that order at the light beam emitting sides of the LDs 101*a*, 101*b*. The light beams transmitted through the cylindrical lenses 110*a*, 110*b* are converged by the cylindrical lenses 110*a*, 110*b* along the subscanning direction (the direction perpendicular to the scanning direction of the light beams), and are focused on a deflecting face 104*a* of the polygon mirror 104.

Reflecting mirrors 103*a*, 103*b* for reflecting the light beams are respectively disposed at left and right symmetrical positions with respect to the central line 106 at light beam emitting sides of the cylindrical lenses 110*a*, 110*b*. The polygon mirror 104 having a regular polygonal columnar shape is disposed at the light beam reflecting sides of the reflecting mirrors 103*a*, 103*b*. Plural deflecting faces (mirror faces) having the same width are formed at the side surface portions of the polygon mirror 104. The polygon mirror 104 is rotated around a central axis O by an unillustrated driving means at a substantially equal angular velocity in the direction P. An $f^{\theta}$ lens 105 is disposed between the reflecting mirrors 103*a*, 103*b* and the polygon mirror 104. The $f^{\theta}$ lens 105 is formed from two lenses 105*a*, 105*b* having power only in the main scanning direction, and is disposed such that the lens optical axis coincides with the central line 106.

When the divisional light scanning device 18 is an overfield optical system, the $f^{\theta}$ lens 105 is constructed such that the light beams A and B incident from the reflecting mirrors 103*a*, 103*b* are converged in the main scanning direction as an optical image having a linear shape and a length longer than the face width Fa of the polygon mirror 104. At this time, the light beams A and B are incident such that their central axes reach the same position or different positions on the same deflecting face 104*a* of the polygon mirror 104. Thus, the light beams are converged such that the light beams span plural deflecting faces including the deflecting face 104*a*. In contrast, when the divisional light scanning device 18 is an underfield optical system, the $f^{\theta}$ lens 105 is constructed such that the light beams A and B incident from the reflecting mirrors 103*a*, 103*b* are converged in the main scanning direction as an optical image having a linear shape and a length shorter than the face width Fa on the deflecting face 104*a* of the polygon mirror 104.

Figure 4A:
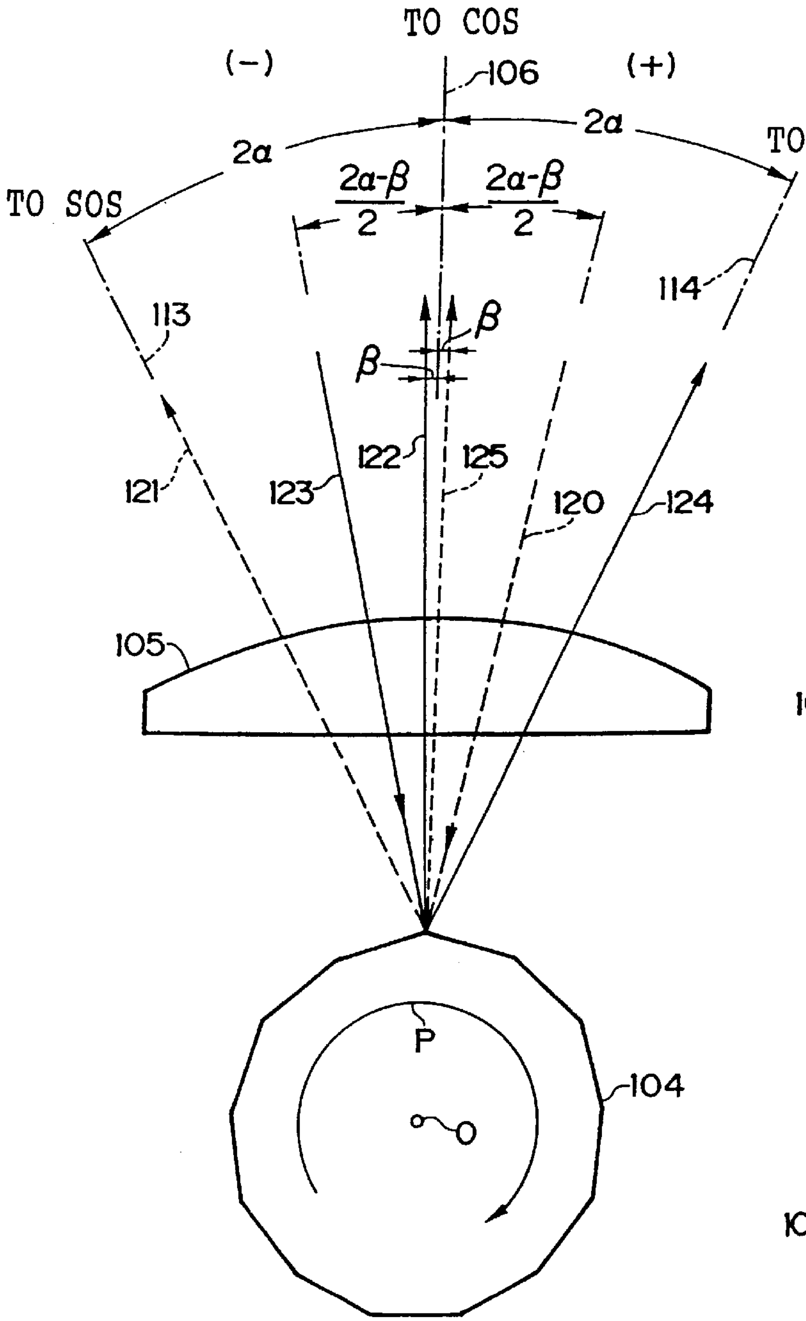
FIG. 4A is a plan view for explaining scanning angles, incident angles and deflecting angles of beams A and B incident on a polygon mirror.
Figure 4B:
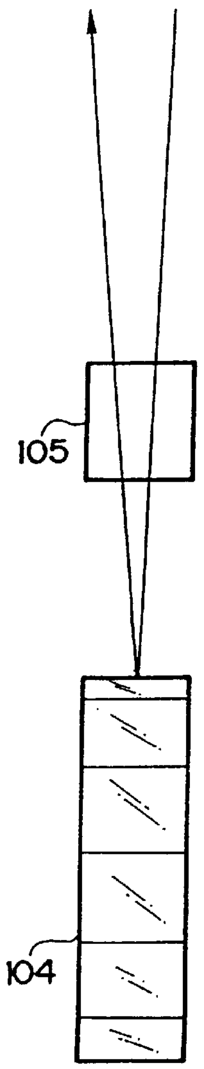
FIG. 4B is a side view thereof.

Further, the $f^{\theta}$ lens 105 is disposed such that the light beams deflected by the polygon mirror 104 are again transmitted through the $f^{\theta}$ lens 105 (a so-called double pass, and refer to the side view of FIG. 4B as well). The $f^{\theta}$ lens 105 is structured such that the retransmitted light beams A and B are converged as light spots on the photosensitive body drum 12, and the light spots of the light beams A and B deflected at a substantially equal angular velocity are moved on the photosensitive body drum 12 at substantially equal speeds along the scanning direction.

A cylindrical mirror 107 is disposed within the box body 100 on a side opposite to the side at which the LDs 101*a*, 101*b* and the polygon mirror 104 are disosed. The cylindrical mirror 107 corrects a shift in the position of the polygon mirror 104 in the subscanning direction (a so-called face-inclining error) caused by dispersion of the inclinations of the deflecting faces of the polygon mirror 104 in the subscanning direction. The light beams A and B deflected by the polygon mirror 104 are reflected on the cylindrical mirror 107 and are irradiated onto the peripheral surface of the photosensitive body drum 12 disposed outside of the box body 100 at a lower side of the cylindrical mirror 107.

The divisional light scanning device 18 is disposed such that the scanning direction (the main scanning direction) of the light beams A and B is parallel to an axis of the photosensitive body drum 12. Accordingly, when the polygon mirror 104 is rotated, the irradiating positions (the positions of the light spots) of the light beams A and B on the peripheral surface of the photosensitive body drum 12 are moved in the main scanning direction along a scanning line 112. As mentioned above, the photosensitive body drum 12 is rotated around its axis (rotating shaft W) at a constant rotating speed, and the scanning line 112 is successively moved in the subscanning direction on the peripheral surface of the photosensitive body drum 12. Thus, subscanning is carried out and an electrostatic latent image is formed on the peripheral surface of the photosensitive body drum 12.

An SOS (Start Of Scan) sensor 108 is disposed within the box body 100. The SOS sensor 108 detects the light beam A at a position corresponding to an optical path of the light beam A retransmitted and emitted from the $f^{\theta}$ lens 105 when the deflecting face 104*a* of the polygon mirror 104 is oriented so as to reflect the incident light beam A to an end portion at the scan starting side of an optical scanning range of the light beam A. The SOS sensor 108 is connected to the control section 30 (see FIG. 5) and a signal outputted from the SOS sensor 108 is inputted to the control section 30 as a horizontal Synchronizing signal.

The relationship between the polygon mirror 104 and the incident light beams A and B will next be explained with reference to FIG. 4A. In FIG. 4A, the light beam A is shown by a dotted line and the light beam B is shown by a solid line, and the $f^{\theta}$ lens 105 is simplified and shown as a single lens. In the plan view of FIG. 4, the sign of the angles is set to be positive on the right-hand side (EOS side) of the a central line 106 which reaches a scanning central position (Center Of Scan) COS, and is set to be negative on the left-hand side (SOS side) of the central line 106.

As shown by the plan view of FIG. 4A (the left-hand side figure), a scanning angle scanned by the light beams A and B of the divisional light scanning device 18 is set to $\pm 2\alpha$ with respect to the central line 16 reaching the scanning central position COS. Namely, an angle formed by the central line 106 and a line 113 which reaches the scanning starting position SOS is set to $-2\alpha$, and an angle formed by the central line 106 and a line 114 which reaches a scanning end position (End Of Scan) EOS is set to $+2\alpha$. On the other hand, the angle of an incident optical axis 123 of the light beam A incident on the deflecting face 104*a* of the polygon mirror 104 with respect to the central line 106 is set to $-(2\alpha-\beta)/2$, and the angle of an incident optical axis 120 of the light beam B incident on the same deflecting face 104*a* with respect to the central line 106 is set to $+(2\alpha-\beta)/2$.

In the above structure, while the polygon mirror 104 is rotated by a predetermined angle (an angle corresponding to one main scan of the light beam), the light beam A incident along the incident optical axis 123 is changed from a deflected state, in which the light beam A is emitted along a line 122 offset toward the SOS side by an angle $\beta$ from the COS, to a deflected state, in which the light beam A is emitted along a line 124 reaching the EOS. Simultaneously, the light beam B incident along the incident optical axis 120 is changed from a deflected state, in which the light beam B is emitted along a line 121 reaching the SOS, to a deflected state, in which the light beam B is emitted along a line 125 offset toward the EOS side by an angle $\beta$ from the COS.

Figure 1A:
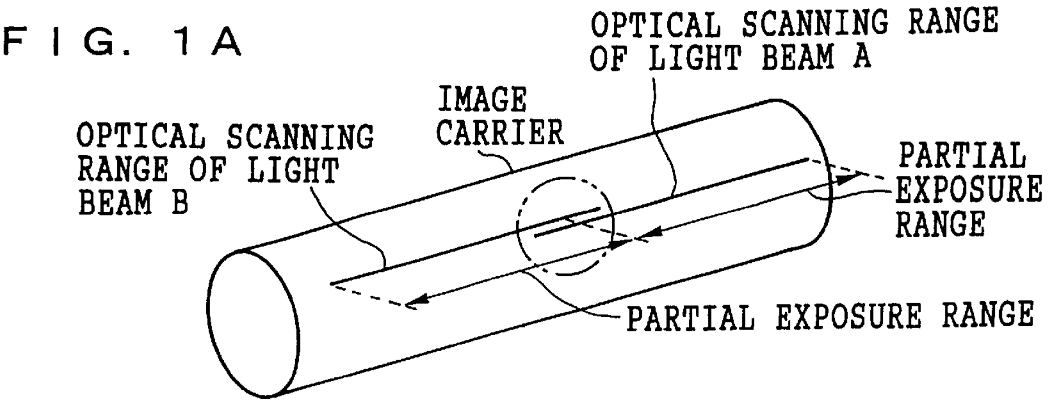
Figure 1B:
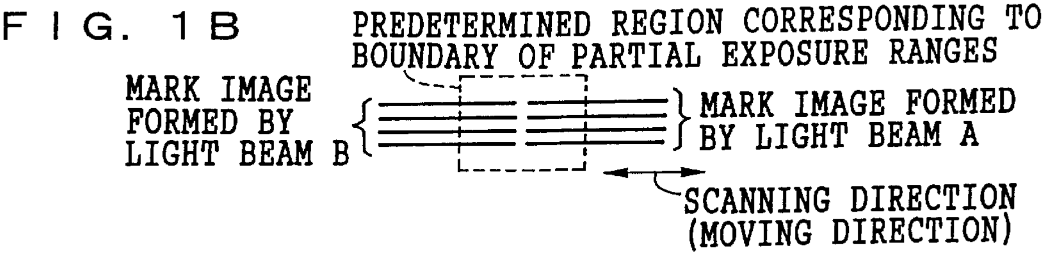
Figure 1C:
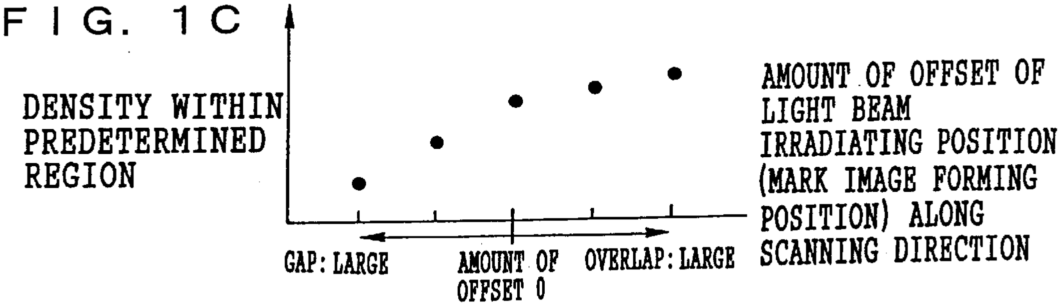

As can be seen from FIG. 4A, a deflecting range (a range between lines 122 and 124) of the light beam A emitted from the polygon mirror 104, and a deflecting range (a range between lines 121 and 125) of the light beam B emitted from the polygon mirror 104 are partially overlapped. Accordingly, as shown in FIG. 1A as an example, the optical scanning range of each of the light beams A and B on the peripheral surface of the photosensitive body drum 12 includes a corresponding partial exposure range when the exposure range on the peripheral surface of the image carrier is divided into two partial exposure ranges along the scanning direction of the light beams in accordance with both of the light beams. Further, an end portion of this optical scanning range is an overlapping range along the subscanning direction at a boundary of the partial exposure ranges (see the portion surrounded by the imaginary line in FIG. 1A).

Thus, the exposure range on the peripheral surface of the photosensitive body drum 12 is divided into two partial exposure ranges, and these two partial exposure ranges are simultaneously scanned by one main scan of the light beams A and B. As shown in FIG. 8, the light beams A and B are modulated by a timing control circuit, which will be described later, in accordance with an image to be formed and within the approximately same exposure period which is set on the basis of an output (the horizontal synchronizing signal) from the SOS sensor 108. Accordingly, the overlapping region (hereinafter called "the overlap region") of the optical scanning range of the light beam A and the optical scanning range of the light beam B on the peripheral surface of the photosensitive body drum 12 is scanned and exposed by the light beam A at the beginning of the exposure period, and is scanned and exposed by the light beam B at the end of the exposure period.

Figure 5:
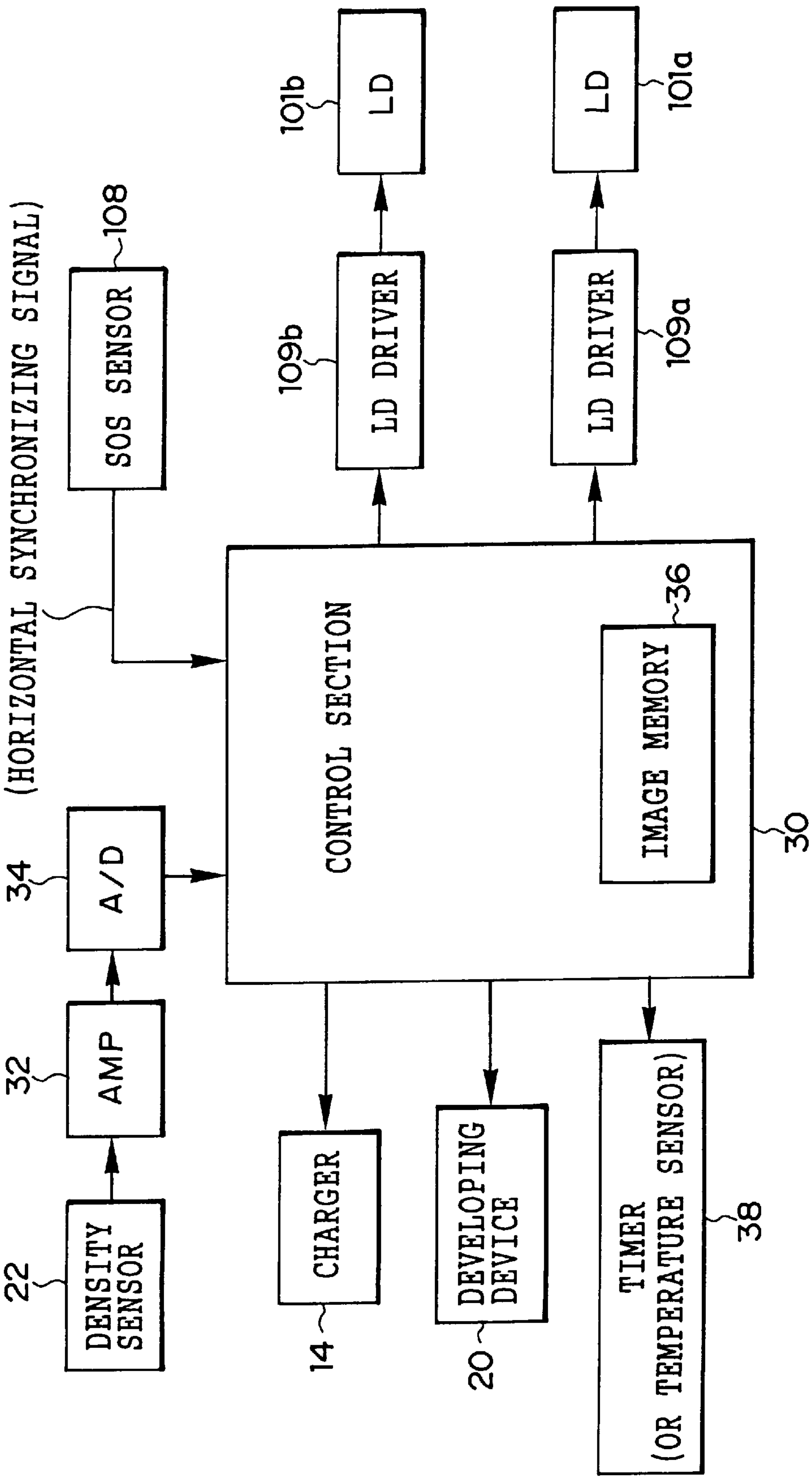
FIG. 5 is a block diagram showing the connected relationship between a control section of the image forming device and peripheral devices.

The control section 30 shown in FIG. 5 has a CPU, a ROM, a RAM and input-output ports (these members are not illustrated), and these members are connected to each other through buses. The control section 30 has an image memory 36 for storing image data expressing the image to be formed on the recording sheet 26, and has a timing control circuit (not shown in FIG. 5 and described in detail later) for controlling the driving timing of each of the LDS 101*a*, 101*b*. Mark image data are fixedly stored in the image memory 36. The mark image data express a mark image (which will be described in detail later) repeatedly formed on the peripheral surface of the photosensitive body drum 12 when light beam irradiating position adjusting processing which will be described later is performed. A timer 38 for measuring elapsed time is connected to the control section 30. The timer 38 corresponds to the timing means described in claim 10. A temperature sensor, which serves as the temperature detecting means described in claim 11, may be provided instead of the timer 38.

Figure 6:
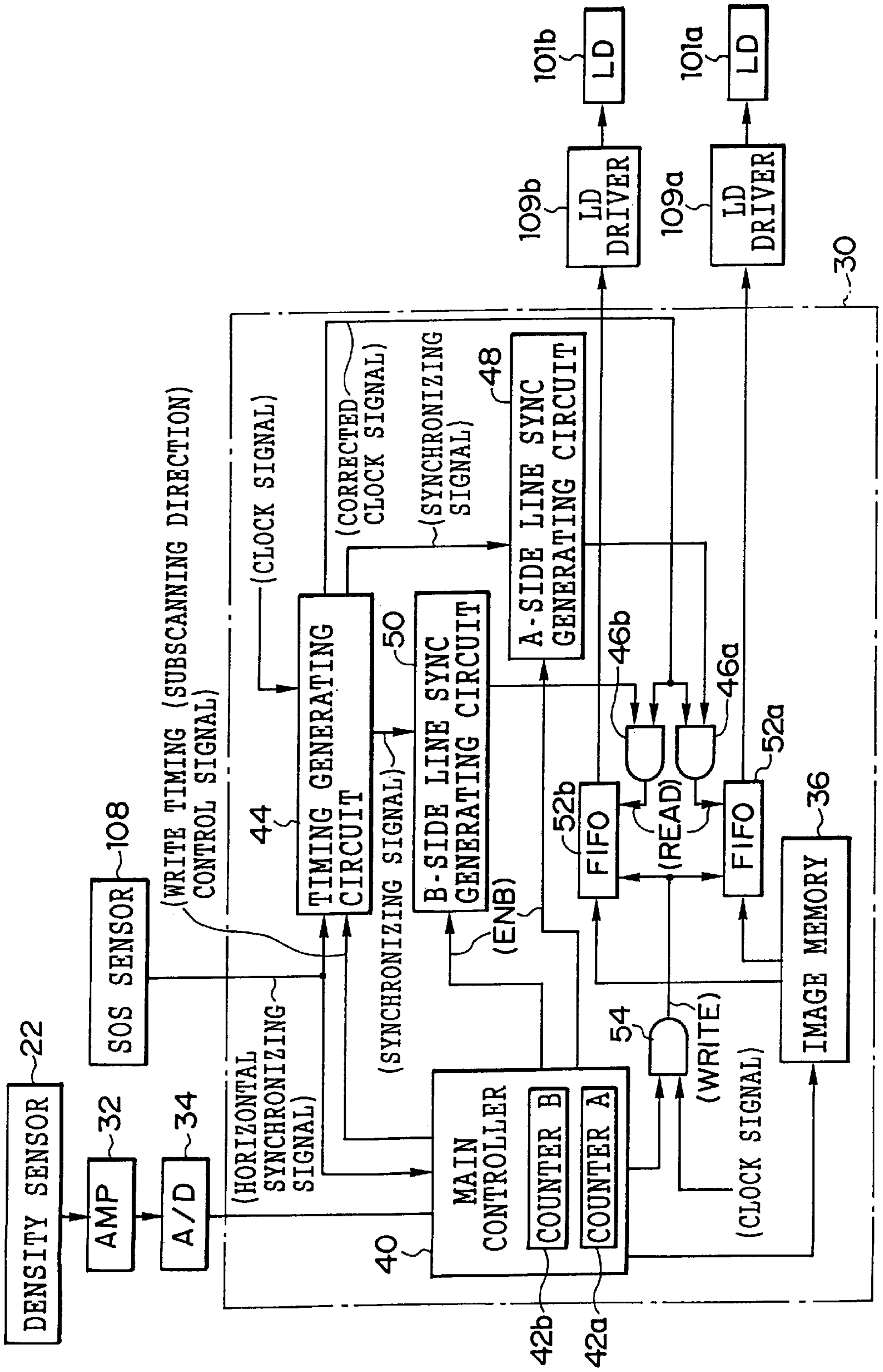
FIG. 6 is a block diagram showing the structure of a control circuit for controlling driving timing of LDs in particular in the control section.

The above timing control circuit is structured as shown in FIG. 6. Namely, the control section 30 is structured so as to include a CPU or the like, and has a main controller 40 for controlling various kinds of calculation and the overall operation of the timing control circuit. Signal output terminals of an A/D converter 34 and the SOS sensor 108 are connected to the control section 30. Density data expressing a density value detected by a density sensor 22 is inputted to the control section 30. A horizontal synchronizing signal is also inputted to the control section 30 from the SOS sensor 108. Counters 42*a*, 42*b* for judging starting and ending timings of the exposure periods of the light beams A and B are built-in in the main controller 40.

The signal output terminal of the SOS sensor 108 is also connected to a signal input terminal of a timing generating circuit 44. The horizontal synchronizing signal from the SOS sensor 108 is inputted to the timing generating circuit 44. A clock signal generated by an unillustrated clock signal generating circuit is also inputted to the timing generating circuit 44. The period of this clock signal coincides with the recording period of dots in the main scans of the light beams. However, since this clock signal is a signal not generated synchronously with the horizontal synchronizing signal, phases of this clock signal and the horizontal synchronizing signal are offset from one another. Therefore, the timing generating circuit 44 generates a corrected clock signal having the same period as the clock signal and the same phase as the horizontal synchronizing signal, on the basis of the inputted horizontal synchronizing signal and the clock signal. A signal output terminal of the timing generating circuit 44 is connected to each of the input terminals of AND circuits 46*a*, 46*b*, and the corrected clock signal is outputted to each of the AND circuits 46*a*, 46*b*.

An A-side line sync generating circuit 48 and a Bside line sync generating circuit 50 are connected to the signal output terminal of the timing generating circuit 44. On the basis of the horizontal synchronizing signal inputted from the SOS sensor 108, the timing generating circuit 44 generates a synchronizing signal expressing a period in which the light beam A scans a predetermined optical scanning range on the peripheral surface of the photosensitive body drum 12. The timing generating circuit 44 outputs the generated synchronizing signal to the A-side line sync generating circuit 48. Also on the basis of the horizontal synchronizing signal inputted from the SOS sensor 108, the timing generating circuit 44 generates a synchronizing signal expressing a period in which the light beam B scans a predetermined optical scanning range on the peripheral surface of the photosensitive body drum 12. The timing generating circuit 44 outputs the generated synchronizing signal to the B-side line sync generating circuit 50.

Further, the signal input terminal of the timing generating circuit 44 is connected to the main controller 40. By using as a reference the irradiation start timing (write timing) of the light beam B, the main controller 40 sets a degree of offsetting of the irradiation start timing of the light beam, by a unit which is the time corresponding to one main scan. The main controller 40 then outputs a write timing control signal for instructing the set amount of offset to the timing generating circuit 44. The timing generating circuit 44 starts the output of the synchronizing signal to the Aside line sync generating circuit 48 at a timing which is offset by the set amount of offset from the main controller 40 on the basis of the write timing control signal inputted from the main controller 40, by using as a reference the timing for starting the output of the synchronizing signal to the B-side line sync generating circuit 50.

Signal input terminals of the A-side line sync generating circuit 48 and the B-side line sync generating circuit 50 are connected to the main controller 40. These generating circuits 48, 50 are operated only during a period in which an ENB (enable) signal inputted from the main controller 40 is inputted to these generating circuits 48, 50.

Figures 8A, 8B, 8C:
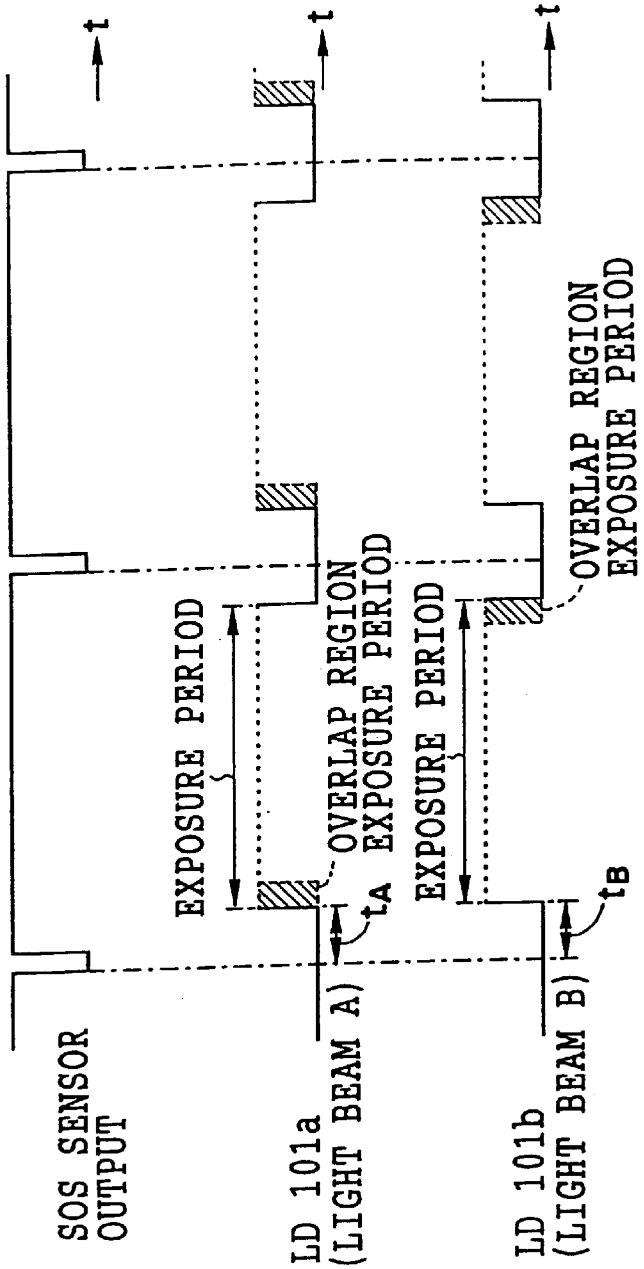
FIGS. 8A to 8C are timing charts showing the relationship between a signal outputted from a SOS sensor and exposure periods by the light beams A and B.

For each of the light beams A and B, the main controller 40 determines the start timing of the exposure period ($t_A$, $t_B$ in FIGS. 8B and 8C) and the length of the exposure period on the basis of a position of the boundary of the partial exposure ranges and the like. When the horizontal synchronizing signal (the output of the SOS sensor) is first changed from a high level to a low level as shown in FIG. 8A in each main scan of the light beams, the main controller 40 sets count values corresponding to times $t_A$, $t_B$ at the counters 42*a*, 42*b* and starts counting-down from the count values. The counters 42*a*, 42*b* repeat the counting-down (decrementing) of the count values at timings synchronized with the clock signal.

The main controller 40 starts the output of an ENB signal to the A-side line sync generating circuit 48 when the count value of the counter 42*a* becomes 0 (namely, when time $t_A$ has elapsed). Further, the main controller 40 sets a count value corresponding to the length of the exposure period of the light beam A at the counter 42*a* and starts counting-down from the count value. When the count value again becomes 0 (namely, when the exposure period of the light beam A has ended), the output of the ENB signal to the A-side line sync generating circuit 48 is stopped. Similarly, when the count value of the counter 42*b* becomes 0 (namely, when time $t_B$ has elapsed) the output of the ENB signal to the B-side line sync generating circuit 50 is started, and a count value corresponding to the length of the exposure period of the light beam B is set at the counter 42*b*, and counting-down from of the count value starts. When the count value again becomes 0 (namely, when the exposure period of the light beam B has ended), the output of the ENB signal to the B-side line sync generating circuit 50 is stopped.

Thus, a signal having a high level only during the exposure period of each light beam in each scan of the light beams is outputted from the A-side line sync generating circuit 48 and the B-side line sync generating circuit 50 at a timing which is offset relatively by the amount of offset set by the main controller 40 by units which are the time corresponding to one main scan. A signal output terminal of the A-side line sync generating circuit 48 is connected to an input terminal of the AND circuit 46*a*, and the B-side line sync generating circuit 50 is connected to an input terminal of the AND circuit 46*b*. The above signals are inputted to the AND circuits 46*a*, 46*b*. An output terminal of the AND circuit 46*a* is connected to a read control signal input terminal of an FIFO memory 52*a*, and an output terminal of the AND circuit 46*b* is connected to a read control signal input terminal of an FIFO memory 52*b*.

Write control signal input terminals of the FIFO memories 52*a*, 52*b* are connected to an output terminal of an AND circuit 54, and an input terminal of the AND circuit 54 is connected to each of the main controller 40 and the above clock signal generating circuit (omitted from the drawings). Data input terminals of the FIFO memories 52*a*, 52*b* are connected to the image memory 36, and data output terminals of the FIFO memories 52*a*, 52*b* are connected to LD drivers 109*a*, 109*b*. An address input terminal of the image memory 36 is connected to the main controller 40.

When an image is formed by irradiating the light beams A and B to the photosensitive body drum 12, image data stored in the image memory 36 are read in a state in which these image data are divided into partial image data A, which express a partial image to be formed by the light beam A, and partial image data B, which express a partial image to be formed by the light beam B. The main controller 40 moves a boundary position (address) of the partial image data A and B along a direction corresponding to the main scanning direction in accordance with the lengths of the exposure periods of the light beams A and B, and determines this boundary position.

The main controller 40 further sets the signal outputted to the AND circuit 54 to a high level, and successively switches addresses inputted to the image memory 36 such that, of the image data stored in the image memory 36, the partial image data A are written in order to the FIFO memory 52*a* and the partial image data B are written in order to the FIFO memory 52*b*. Thus, a signal for switching levels is outputted from the AND circuit 54 at a timing synchronized with the period of the clock signal (namely, the recording period of the dots), and this signal is inputted to the FIFO memories 52*a*, 52*b* as a write control signal (WRITE). Thus, the partial image data A and B are written in order to the FIFO memories 52*a*, 52*b* at the above timing.

A signal, which has the same phase as the horizontal synchronizing signal and whose level is switched in the same period as the recording period of the dots, is outputted from the AND circuit 46*a* only during the exposure period of the light beam A. This signal is inputted to the FIFO memory 52*a* as a read control signal (READ) so that the partial image data A are outputted in order from the FIFO memory 52*a* to the LD driver 109*a* at the same timing as the timing of the switching of the levels of the read control signal. The LD driver 109*a* modulates and drives the LD 101*a* in accordance with the inputted partial image data A at a timing synchronized with the input timing of the partial image data A, and makes the light beam A be emitted from the LD 111*a*.

Similarly to the above case, a signal, which has the same phase as the horizontal synchronizing signal and whose level is switched in the same period as the recording period of the dots, is outputted from the AND circuit 46*b* only during the exposure period of the light beam B. This signal is inputted to the FIFO memory 52*b* as a read control signal (READ) so that the partial image data B are outputted in order from the FIFO memory 52*b* to the LD driver 109*b* at the same timing as the timing of the switching of the levels of the read control signal. The LD driver 109*b* modulates and drives the LD 101*b* in accordance with the inputted partial image data B at a timing synchronized with the input timing of the partial image data B, and makes the light beam B be emitted from the LD 101*b*.

Figure 7A:
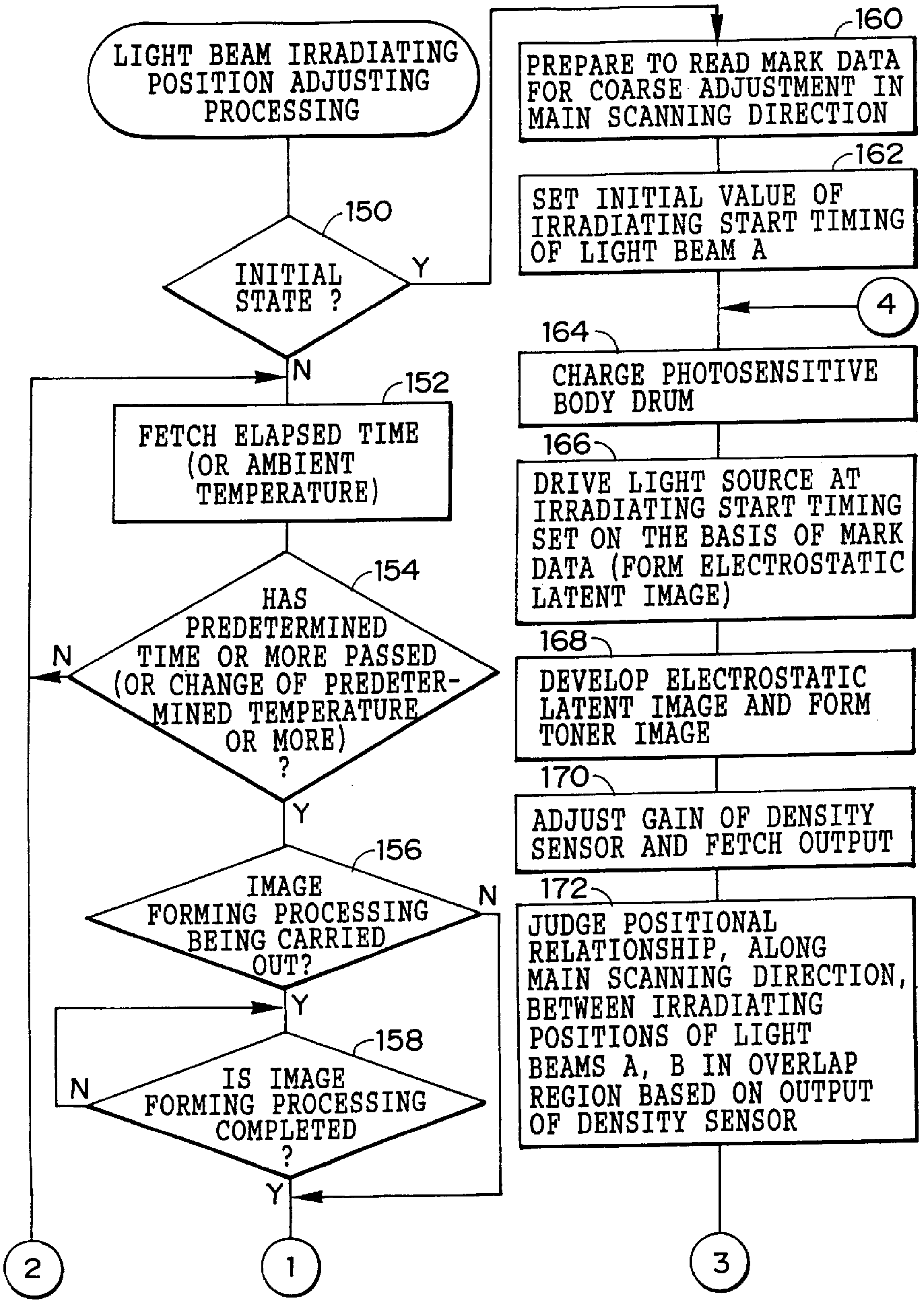
FIGS. 7A and 7B are flow charts for explaining contents of light beam irradiating position adjusting processing.
Figure 7B:
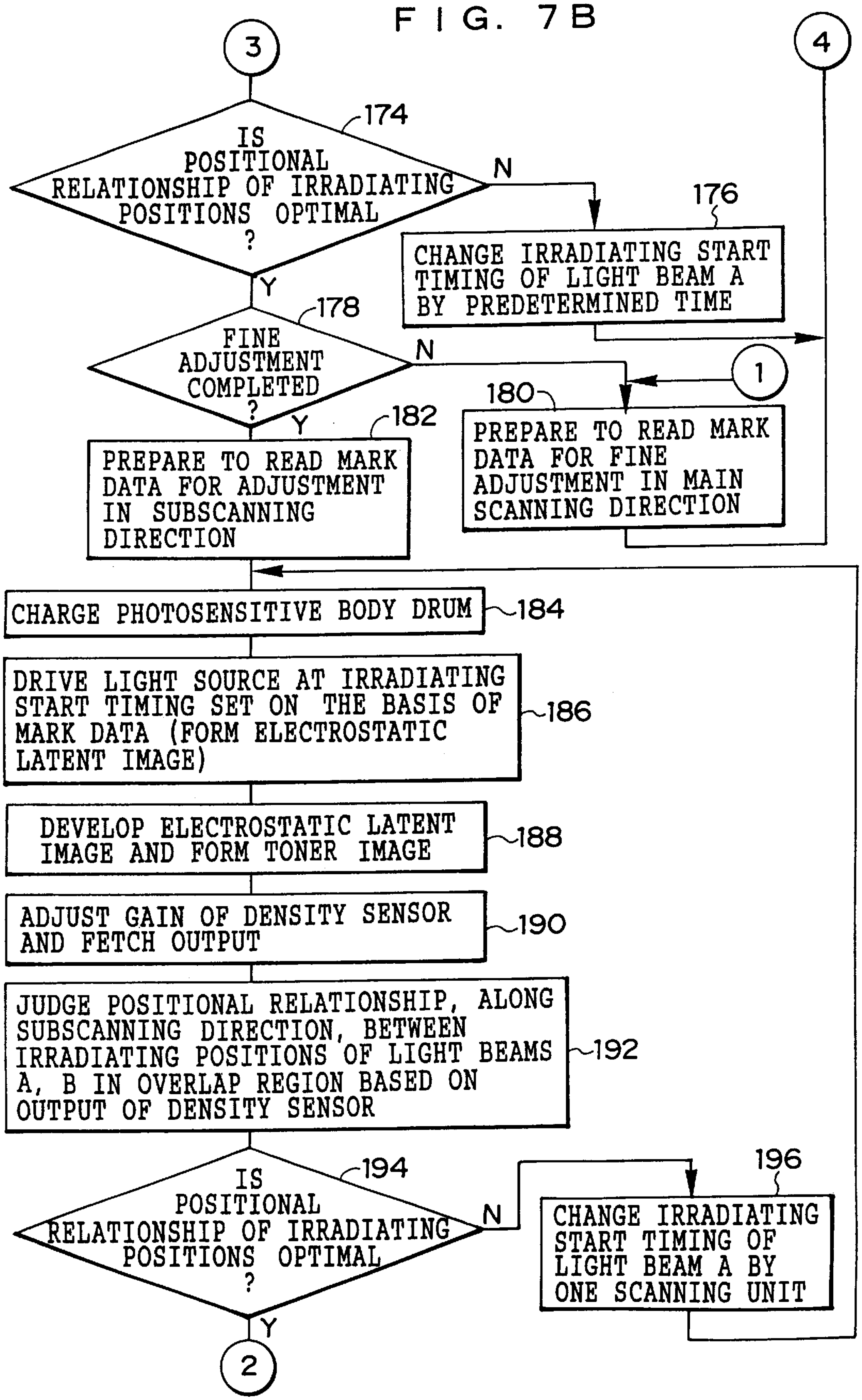

Light beam irradiating position adjusting processing executed by the main controller 40 of the control section 30 will next be explained as operation of the present embodiment, with reference to the flow charts shown in FIGS. 7A and 7B. This processing is executed when the power source of the image processor 10 is turned on.

In a step 150, it is judged whether the present state of the image forming device 10 is an initial state. In this step 150, a state of the image forming device 10 just after turning-on of the power source may be judged to be an initial state. Or, a time when the image forming device 10 is set up or a time when parts are replaced by maintenance or the like may be judged to be an initial state. When the judgment in the step 150 is negative, the routine proceeds to a step 152. When the judgment in the step 150 is affirmative, the irradiating positions of the light beams are adjusted in a step 160 and subsequent steps (first, the irradiating positions of the light beams are coarsely adjusted with respect to the main scanning direction).

Namely, in the step 160, preparations for reading mark data, which express mark images for coarse adjustment in the main scanning direction and which are stored in the image memory 36 in advance, are made (for example, setting the address of the mark data for coarse adjustment in the main scanning direction to a pointer which indicates a reading position from the image memory 36, or the like). In the present embodiment, the mark image for coarse adjustment in the main scanning direction is a mark image in which many bars, which have a width of one dot and which extend along the subscanning direction, are spaced apart from each other by two dots and are arranged along the main scanning direction (see FIGS. 10A to 10D as an example). In a step 162, a predetermined initial value is set as a count value (a count value corresponding to time $t_A$) for prescribing the irradiation start timing of the light beam A in each main scan of the light beam.

In steps from the next step 164 to a step 168, the mark images for coarse adjustment in the main scanning direction are formed on the peripheral surface of the photosensitive body drum 12. Namely, in the step 164, the photosensitive body drum 20 is charged by the charger 14.

In the next step 166, image data (the mark data for coarse adjustment in the main scanning direction in this case) are read in order from a reading position designated by the pointer within a memory region of the image memory 36 and are written in order to the FIFO memories 52*a*, 52*b*. Further, a write timing control signal (which designates "0" as the amount of offset in the subscanning direction when the irradiating positions of the light beams in the main scanning direction are adjusted) is outputted to the timing generating circuit 44. ENB signals are outputted to the A-side line sync generating circuit 48 and the B-side line sync generating circuit 50 at respective predetermined timings (the output start timing of the ENB signal to the A-side line sync generating circuit 48 is determined by the initial value of the count value set in the previous step 162). Further, the mark data for coarse adjustment in the main scanning direction are outputted in order from the FIFO memories 52*a*, 52*b* to the LD drivers 109*a*, 109*b*. Thus, the LDs 101*a*, 101*b* are modulated and driven in accordance with the mark data for coarse adjustment in the main scanning direction. The light beams A and B emitted from the LDs 101*a*, 101*b* are irradiated onto the peripheral surface of the photosensitive body 12. Accordingly, electrostatic latent images of the mark images for coarse adjustment in the main scanning direction shown in FIG. 10 are formed on the peripheral surface of the photosensitive body drum 12.

In the next step 168, the developer 20 is operated to develop the electrostatic latent images of the mark images for coarse adjustment in the main scanning direction formed on the peripheral surface of the photosensitive body drum 12. Thus, toner images of the mark images for coarse adjustment in the main scanning direction are formed on the peripheral surface of the photosensitive body drum 12. Steps 164 to 168 correspond to the image forming control means of the present invention.

Figure 9:
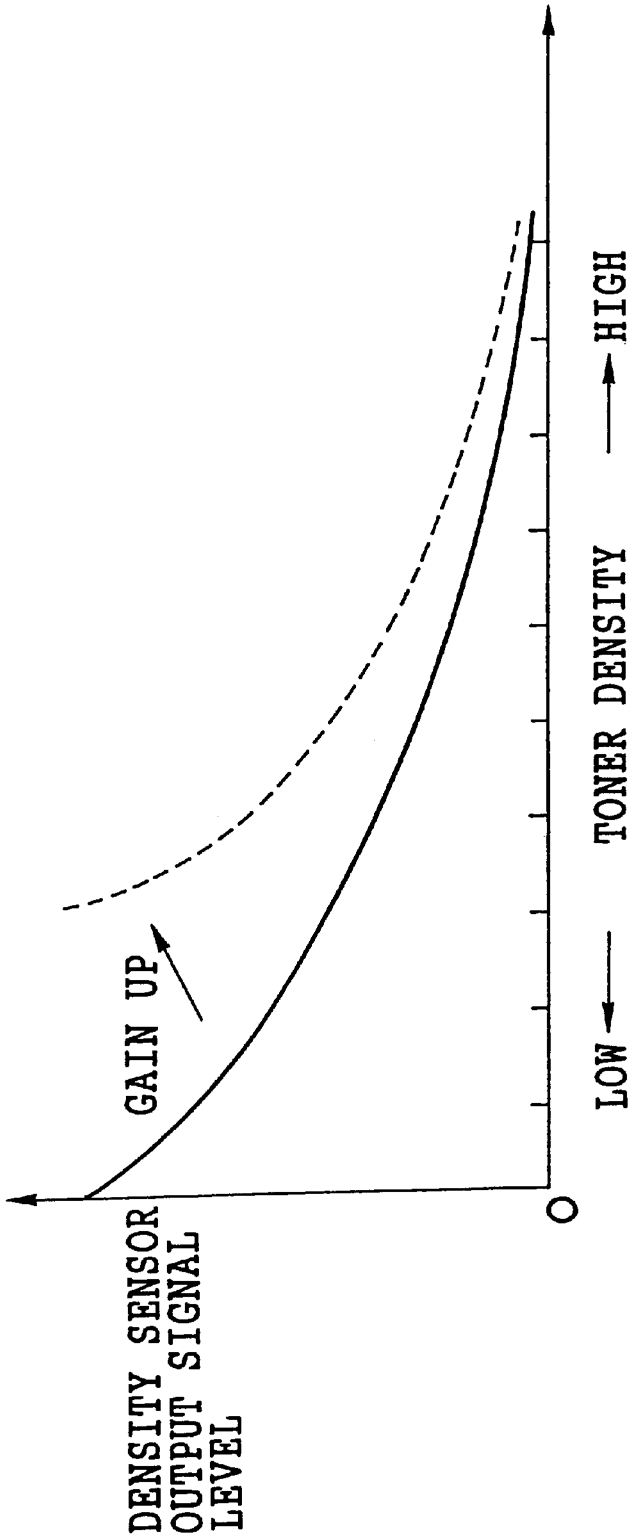
FIG. 9 is a diagram showing one example of a sensitivity characteristic of a density sensor.

As shown by the solid line in FIG. 9, the density sensor 22 in the present embodiment has a sensitivity characteristic in which an output signal level varies non-linearly with respect to changes in the density of the toner image which is a detected object, and the slope of the change in the output signal level with respect to the change in density of the toner image decreases as the density of the toner image increases (namely, sensitivity becomes low). Resolution of the density detection of the toner image decreases and detecting accuracy deteriorates as the density of the toner image which is the detected object increases.

In contrast, the sensitivity characteristic of the density sensor 22 also varies in accordance with gain of the density sensor 22. For example, in FIG. 9, the sensitivity characteristic when the gain of the density sensor 22 is increased is shown by the broken line. In this sensitivity characteristic, the output signal level is saturated when the density of the toner image which is the detected object is a value belonging to a low density region. However, when the density of the toner image which is the detected object is a value belonging to a high density region, the output signal level greatly varies with respect to the change in density of the toner image. In the light beam irradiating position adjusting processing, the irradiating position of the light beam A is changed in the main scanning direction or the subscanning direction as will be described later. The irradiating position of the light beam A is adjusted on the basis of the change in density of the toner image within a density detecting region detected by the density sensor 22. However, the density region of the toner image within the density detecting region is approximately determined by contents of the mark images formed on the peripheral surface of the photosensitive body drum 12.

Therefore, in the next step 170, the gain of the density sensor 22 is adjusted in accordance with the density region of the toner images of the mark images for coarse adjustment in the main scanning direction within the density detecting region, such that the sensitivity of the density sensor 22 with respect to this density region is increased (such that the slope of the change in the output signal level with respect to the density change in the above density region is increased). (This gain adjustment corresponds to the image forming control means described in claim 3.) Thereafter, the output of the density sensor 22 is fetched, and the density within the density detecting region is calculated on the basis of the adjusted gain.

In a step 172, the positional relationship, along the main scanning direction, between a mark formed by the light beam A and a mark formed by the light beam B, i.e., the positional relationship along the main scanning direction of the irradiating positions of the light beams A and B in an overlap region, is judged on the basis of the density within the density detecting region detected by the density sensor 22. In the next step 174, it is judged whether the above positional relationship is optimal. When the mark image is first formed on the peripheral surface of the photosensitive body drum 12, the judgments of steps 172 and 174 cannot be carried out and thus the judgment in step 174 is unconditionally negative and the routine proceeds to a step 176.

In the step 176, a count value (a count value corresponding to time $t_A$) prescribing the irradiation start timing of the light beam A in each main scan of the light beam is changed by a unit of a predetermined amount (a value corresponding to three periods (three dots) in a dot recording period), and the routine is returned to the step 164. Thus, in steps 164 to 168, the toner images of the mark images for coarse adjustment in the main scanning direction are again formed on the peripheral surface of the photosensitive body drum 12, but the irradiation start timing (timing for starting the exposure period) of the light beam A in each main scan of the light beam is changed by three dots, such that the irradiating position of the light beam A on the photosensitive body drum 12 is moved by three dots along the main scanning direction. Accordingly, the forming position of the mark image formed by the light beam A is moved by three dots along the main scanning direction with respect to the forming position of the mark image formed by the light beam B. Thus, the positional relationship between the marks formed by the light beams A and B is changed by three dots along the main scanning direction.

Figure 10A:
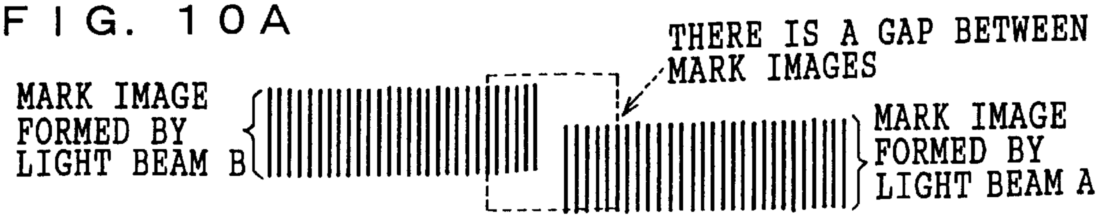
FIGS. 10A to 10D are plan views each showing one example of the positional relationship between a mark images for coarse adjustment in a main scanning direction formed by the light beams A and B.
Figure 10B:
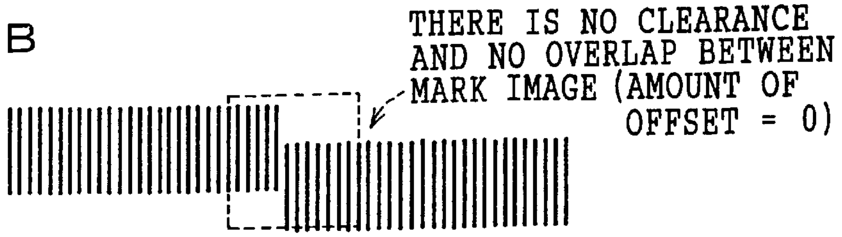
Figure 10C:
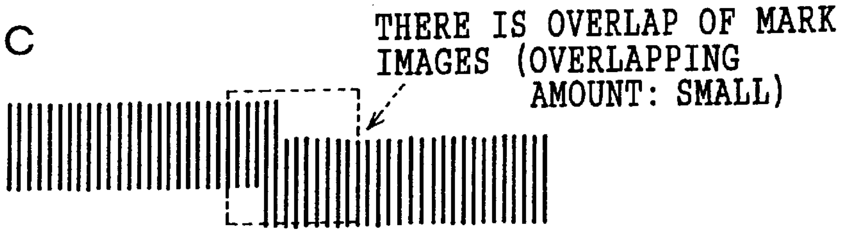
Figure 10D:
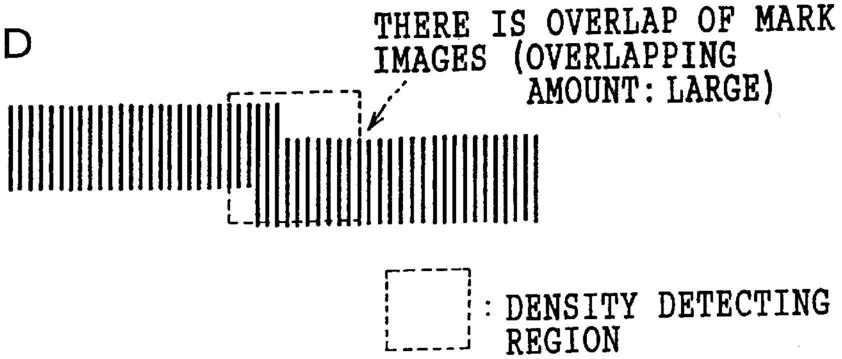
Figure 10E:
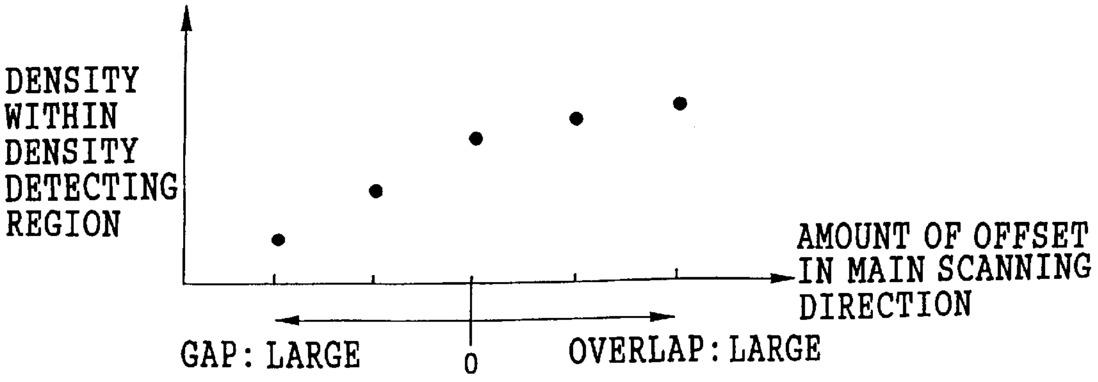
FIG. 10E is a diagram showing one example of changes in density within a density detecting region with respect to changes in this positional relationship.
Figure 11A:
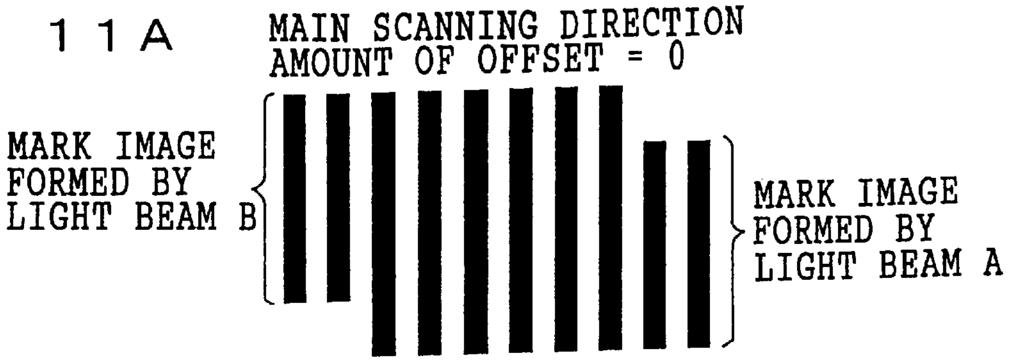
FIGS. 11A to 11D are plan views each enlargedly showing one example of the positional relationship between mark images for fine adjustment in the main scanning direction formed by the light beams A and B.
Figure 11B:
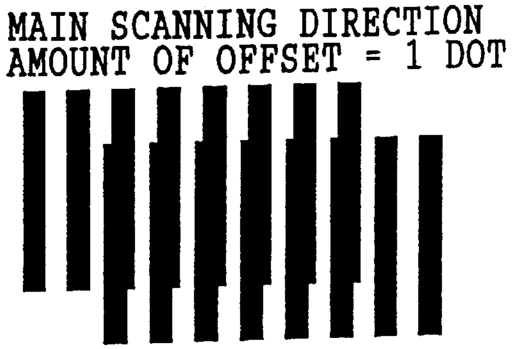
Figure 11C:
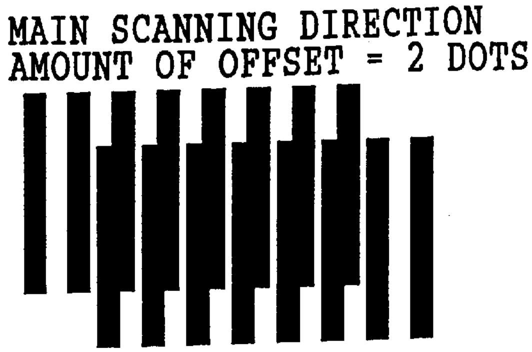
Figure 11D:
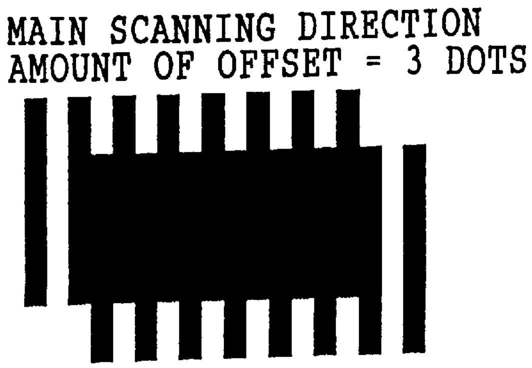

The density within the density detecting region varies as shown in FIG. 10E when the forming position of the mark image for coarse adjustment in the main scanning direction formed by the light beam A is varied with respect to the forming position of the mark image for coarse adjustment in the main scanning direction formed by the light beam B as shown in FIGS. 10A to 10D. The slope of the density change within the density detecting region is changed with, as a boundary, the time when the positional relationship is such that the mark image for coarse adjustment in the main scanning direction formed by the light beam A and the mark image for coarse adjustment in the main scanning direction formed by the light beam B have no gap therebetween and are not overlapped(when a main scanning direction amount of offset=0 in FIG. 10E).

Accordingly, in the judgment of the positional relationship in the above step 172, steps 164 to 176 are repeated plural times and the slope of the density change within the density detecting region is calculated on the basis of the density within the density detecting region detected by the density sensor 22. It is then judged on the basis of the slope of the density change whether both mark images are in a state in which there is a gap therebetweeen along the main scanning direction, are in an overlapping state, or are in a state in which there is no gap therebtween and the mark images are not overlapped. The judgment in the above step 174 as to whether the positional relationship is optimal is affirmative when the present positional relationship of both mark images is judged, on the basis of the judged results in the step 172, to be a state in which there is no gap between the mark images and the mark images are not overlapped. These steps 172 and 174, together with the step 176, correspond to the control means described in claim 6 (the control means described in claim 7 in more detail).

In the present embodiment, the mark image for coarse adjustment in the main scanning direction is a mark image in which many bars, which have a width of one dot and extend along the subscanning direction, are spaced apart from each other by two dots and are arranged along the main scanning direction. Accordingly, when the judgment in the step 174 is affirmative, the irradiation start timing of the light beam A in each main scan of the light beam is adjusted such that the amount of offset of the irradiating positions of the light beams A and B with respect to the main scanning direction becomes, at most, three dots or less. When the judgment in the step 174 is affirmative, the coarse adjustment of the irradiating positions of the light beams with respect to the main scanning direction is completed, and the routine proceeds to a step 178.

In the step 178, it is judged whether fine adjustment of the irradiating positions of the light beams along the main scanning direction has been completed. When this judgment is negative, the routine proceeds to a step 180. In this step 180, preparations for reading mark data, which express mark images for fine adjustment in the main scanning direction and are stored in the image memory 36 in advance, are made (for example, setting an address of the mark data for fine adjustment in the main scanning direction to a pointer indicating a reading position from the image memory 36, or the like) In the present embodiment, the mark image for fine adjustment in the main scanning direction is a mark image in which many bars, which have a width of three dots and extend along the subscanning direction, are spaced apart from each other by three dots and are arranged along the main scanning direction (see FIGS. 11A to 11D as an example)

As shown in FIGS. 11A to 11D, the main controller 40 reduces a count value (a count value corresponding to time $t_A$), which prescribes the irradiation start timing of the light beam A in each main scan of the light beam, by a predetermined length, by using as a reference a value judged as an optimum in the coarse adjustment of the irradiating positions of the light beams with respect to the main scanning direction as explained above, such that a mark image for fine adjustment in the main scanning direction formed by the light beam A and a mark image for fine adjustment in the main scanning direction formed by the light beam B are overlapped by this predetermined length along the main scanning direction.

When the processing in the step 180 is performed, the routine is returned to the step 164. Steps 164 to 176 are repeated, and fine adjustment of the irradiating positions of the light beams with respect to the main scanning direction is carried out. In this fine adjustment, in step 176, the count value prescribing the irradiation start timing of the light beam A in each main scan of the light beam is changed by a unit which is a value corresponding to one period (one dot)

of the dot recording period. Accordingly, toner images of plural mark images are respectively formed on the peripheral surface of the photosensitive body drum 12 such that the forming position of the mark image formed by the light beam A is offset by one dot along the main scanning direction from the forming position of the mark image formed by the light beam B (see FIGS. 11A to 11D).

Figure 12:
FIG. 12 is a diagram showing one example of changes in density within the density detecting region with respect to changes in the positional relationship between the mark images for fine adjustment in the main scanning direction formed by the light beams A and B.
Figure 13A:
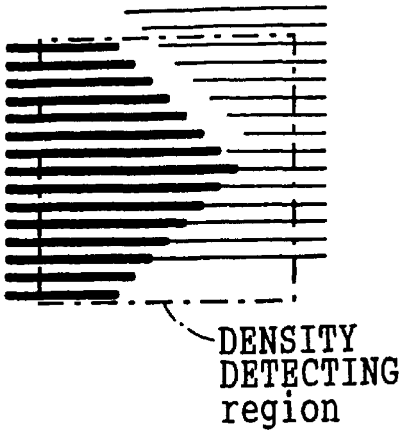
FIGS. 13A to 13E are plan views each showing one example of the positional relationship between mark images for adjustment in a subscanning direction formed by the light beams A and B.
Figure 13B:
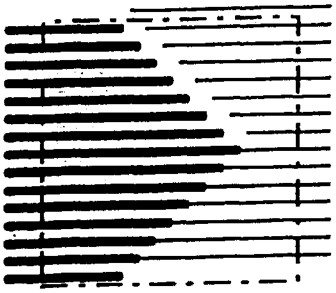
Figure 13C:
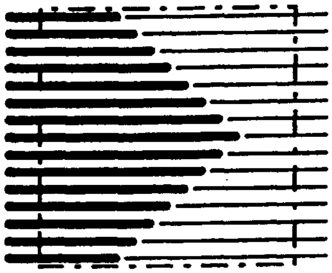
Figure 13D:
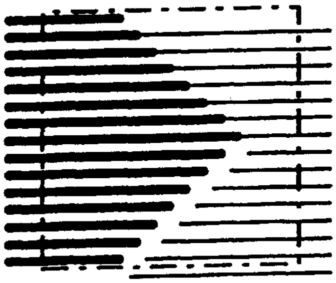
Figure 13E:
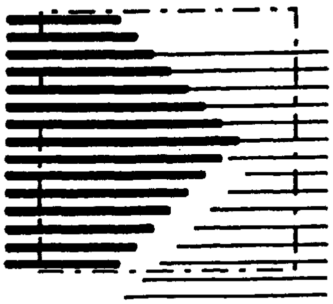
Figure 13E:
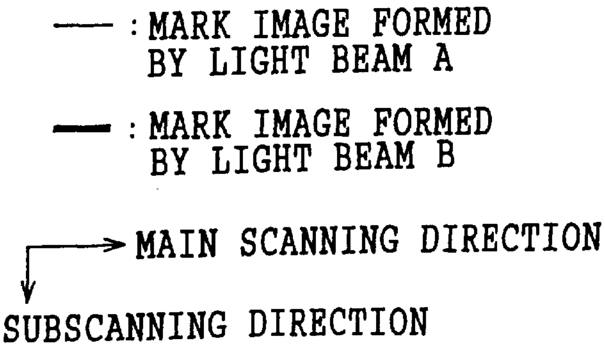

The density within the density detecting region is changed as shown in FIG. 12 when the positional relationship of the forming position of the mark image for fine adjustment in the main scanning direction formed by the light beam A with respect to the forming position of the mark image for fine adjustment in the main scanning direction formed by the light beam B is changed as shown in FIGS. 11A to 11D. The density within the density detecting region is minimized when the amount of offset along the main scanning direction between the mark image for coarse adjustment in the main scanning direction formed by the light beam A and the mark image for the coarse adjustment in the main scanning direction formed by the light beam B is zero.

Accordingly, the positional relationship in the above step 172 is judged by comparing the density within the density detecting region detected by the density sensor 22 and judging the amount of offset of both mark images in the main scanning direction when steps 164 to 176 are repeated plural times. The judgment in the step 174 is affirmative when the amount of offset in the main scanning direction is judged to be zero in the step 172. Thus, the amount of offset between the irradiating positions of the light beams A and B with respect to the main scanning direction can be set to be smaller than one dot.

When an image is actually formed on the recording sheet 26, the count value (the count value corresponding to time $t_A$), which prescribes the irradiation start timing of the light beam A in each main scan of the light beam, is a value obtained by correcting a value, which is judged to be an optimum in the coarse adjustment of the irradiating position of the light beam with respect to the main scanning direction, by the difference between an initial value in the fine adjustment of the irradiating position of the light beam with respect to the main scanning direction and a value judged to be an optimum in the fine adjustment of the irradiating position of the light beam with respect to the main scanning direction. Thus, the amount of offset of the irradiating positions of the light beams A and B with respect to the main scanning direction in the overlap region can be set to be smaller than one dot.

When the fine adjustment of the irradiating positions of the light beams with respect to the main scanning direction is completed, the judgment in the step 178 is affirmative, and the routine proceeds to a step 182. In step 182 and subsequent steps, the irradiating positions of the light beams along the subscanning direction are adjusted. Further, preparations are made for reading mark data, which express mark images for an adjustment in the subscanning direction and which are stored in the image memory 36 in advance. In the present embodiment, as shown in FIGS. 13A to 13E as an example, the mark image for an adjustment in the subscanning direction is a mark image formed such that many bars, which have a predetermined width and which extend along the subscanning direction, are spaced apart from each other by a predetermined width and are arranged along the subscanning direction, and the positions of end portions of the respective bars are arranged along slanting directions with respect to the main scanning direction and the subscanning direction in the overlap region (an envelope connecting the end portions of the respective bars is set to be convex toward the optical scanning region side of the light beam A).

Bars of the mark image formed by the light beam A are shown by thin lines and bars of the mark image formed by the light beam B are shown by thick lines to differentiate the mark images formed by the light beams A and B from each other in FIGS. 13A to 13E. However, the thicknesses of both bars may be set to be equal to each other or different from each other, and may be determined in accordance with the sensitivity characteristic of the density sensor 22.

In steps from the next step 184 to a step 188, similarly to the above steps 164 to 168, the mark images for adjustment in the subscanning direction are formed on the peripheral surface of the photosensitive body drum 12. Namely, the photosensitive body drum 12 is charged by the charger 14 in the step 184.

In the next step 186, the mark data for adjustment in the subscanning direction are read in order from the image memory 36 and are written in order to the FIFO memories 52*a*, 52*b*. A write timing control signal is outputted to the timing generating circuit 44, and ENB signals are outputted to the A-side line sync generating circuit 48 and the B-side line sync generating circuit 50 at respective constant timings. Further, the mark data for adjustment in the subscanning direction are outputted in order from the FIFO memories 52*a*, 52*b* to the LD drivers 109*a*, 109*b*. Thus, the LDs 111*a*, 101*b* are modulated and driven in accordance with the mark data for adjustment in the subscanning direction, and the light beams A and B emitted from the LDs 101*a*, 101*b* are irradiated onto the peripheral surface of the photosensitive body drum 12. Accordingly, electrostatic latent images of the mark images for adjustment in the subscanning direction shown in FIG. 13 are formed on the peripheral surface of the photosensitive body drum 12.

In the step 188, the developer 20 is operated to develop the electrostatic latent images of the mark images for adjustment in the subscanning direction formed on the peripheral surface of the photosensitive body drum 12. Thus, toner images of the mark images for adjustment in the subscanning direction are formed on the peripheral surface of the photosensitive body drum 12. The steps 184 to 188 also correspond to the image forming control means of the present invention.

In the next step 190, similarly to the step 170 explained above, the gain of the density sensor 22 is adjusted in accordance with a density region of the toner images of the mark images for adjustment in the subscanning direction within the density detecting region, such that the sensitivity of the density sensor 22 with respect to this density region is increased. Thereafter, the output of the density sensor 22 is fetched, and the density within the density detecting region is calculated on the basis of the adjusted gain.

In a step 192, the positional relationship, along the subscanning direction, of marks formed by the light beams A and B, i.e., the positional relationship along the subscanning direction of the irradiating positions of the light beams A and B in an overlap region, is judged on the basis of the density detected by the density sensor 22 within the density detecting region. In the next step 194, it is judged whether the above positional relationship is optimal. Similarly to steps 172 and 174 explained above, the judgments in steps 192 and 194 can not be carried out when the mark images for adjustment in the subscanning direction are first formed on the peripheral surface of the photosensitive body drum 12. Accordingly, the judgment in the step 194 is unconditionally negative, and the routine proceeds to a step 196.

In the step 196, an amount of offset of the irradiation start timing of the light beam A is designated to the timing generating circuit 44 by a write timing control signal to change the irradiation start timing of the light beam A, by a unit which is the time corresponding to one main scan, by using the irradiation start timing of the light beam B as a reference. Then, the routine is returned to the step 184.

Thus, in steps 184 to 188, the toner images of the mark images for adjustment in the subscanning direction are again formed on the peripheral surface of the photosensitive body drum 12. However, on the basis of the inputted write timing control signal, the timing generating circuit 44 starts the output of a synchronizing signal to the A-side line sync generating circuit 48 at a timing offset by the amount of offset set from the main controller 40, with the start timing of the output of a synchronizing signal to the B-side line sync generating circuit 50 as a reference. Accordingly, the irradiation start timing of the light beam A is changed by a unit which is the time corresponding to one main scan. Further, the forming position of the mark image formed by the light beam A is moved with respect to the forming position of the mark image formed by the light beam B by a unit which is one line along the subscanning direction. Thus, the positional relationship between the marks formed by the light beams A and B is changed by a unit which is one line along the subscanning direction.

Figure 14:
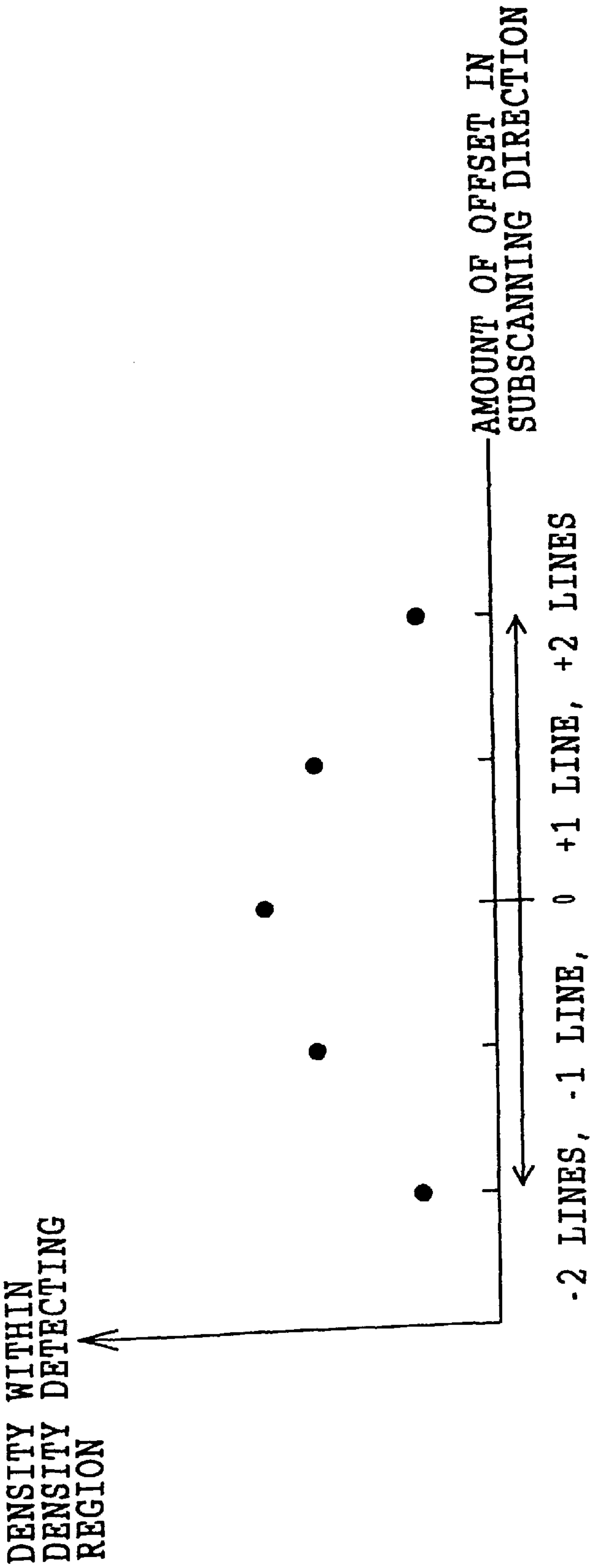
FIG. 14 is a diagram showing one example of changes in density within the density detecting region with respect to a change in the positional relationship between mark images for adjustment in the subscanning direction formed by the light beams A and B.

When the forming position of the mark image for adjustment in the subscanning direction formed by the light beam A is offset from the forming position of the mark image for adjustment in the subscanning direction formed by the light beam B in units of one line as shown in FIGS. 13A to 13E, the density within the density detecting region varies as shown in FIG. 14. The density within the density detecting region is maximized when the amount of offset along the subscanning direction between the mark images for adjustment in the subscanning direction formed by the light beams A and B is zero (when there is the state shown in FIG. 13C).

Accordingly, the positional relationship is judged in the above step by comparing the density detected by the density sensor 22 within the density detecting region and judging the amount of offset of both mark images in the subscanning direction when steps 184 to 196 are repeated plural times. When the amount of offset in the scanning direction is judged to be zero in step 192, the judgment in the step 194 is affirmative. Thus, the amount of offset of the irradiating positions of the light beams A and B with respect to the subscanning direction can be set to be smaller than one line. These steps 192 and 194, as well as step 196, correspond to the control means described in claim 6 (the control means described in claim 8 in more detail).

With respect to the mark images for adjustment in the subscanning direction shown in FIGS. 13A to 13E, for example, the change in surface area of a portion within the density detecting region to which no toner has adhered is when the amount of offset in the subscanning direction is changed by units of one line, is large as compared to the mark images shown in FIG. 1D, FIGS. 10A to 10D and FIGS. 11A to 11D. Accordingly, it is possible to precisely judge the amount of offset along the subscanning direction between the mark images for adjustment in the subscanning direction formed by the light beams A and B.

When an image is actually formed on the recording sheet 26, the amount of offset, which is judged to be an optimum in the above adjustment of the irradiating positions of the light beams with respect to the subscanning direction, is used as the amount of offset the irradiation start timing of the light beam A with respect to the irradiation start timing of the light beam B. This amount of offset is designated to the timing generating circuit 44 by a write timing control signal.

Thus, as mentioned above, the amount of offset between the irradiating positions of the light beams A and B with respect to the main scanning direction in an overlap region can be set to be smaller than one dot. Further, the amount of offset between the irradiating positions of the light beams A and B with respect to the subscanning direction in the overlap region can be also set to be smaller than one line. Accordingly, when the exposure range on the peripheral surface of the photosensitive body drum 12 is divisionally scanned by the light beams A and B and a large-size image is formed on the recording sheet 26 at high speed, it is possible to form an image having a high quality in which generation of a stripe pattern, disturbance of the image, and the like in a portion corresponding to the overlap region are suppressed.

The density on the peripheral surface of the photosensitive body drum 12 is detected without transferring a toner image formed on the peripheral surface of the photosensitive body drum 12 onto the recording sheet 26, and the above irradiating positions of the light beams are adjusted on the basis of this detected density. Accordingly, a recording sheet 26 is not wastefully consumed every time the irradiating positions of the light beams are adjusted.

When the judgment in the step 194 is affirmative and the adjustment of the irradiating positions of the light beams with respect to the subscanning direction has been completed, the timer 38 is reset and the routine then proceeds to a step 152. In the step 152, the time which has elapsed from the completion of the adjustment of the irradiating positions of the light beams is fetched from the timer 38. In the next step 154, it is judged whether a predetermined time or more has passed from completion of the adjustment of the irradiating positions of the light beams (for example, the predetermined time may be set to about 30 minutes, or may be set to any arbitrary time in a range of from several minutes to several hours). When this judgment is negative, the routine is returned to the step 152, and steps 152 and 154 are repeated.

When the predetermined time or more has passed from completion of the adjustment of the irradiating positions of the light beams, there is the possibility that the irradiating positions of the light beams A and B in the overlap region are slightly offset due to offset of the positions of the respective optical parts forming the divisional light scanning device 18 or the like, which is caused by influences such as a change in ambient temperature or the like.

Therefore, when the judgment in the step 154 is affirmative, the routine proceeds to a step 156. In this step 156, it is judged whether the image forming device 10 is in a state of carrying out processing for forming an image on the recording sheet 26. When this judgment is negative, the routine proceeds to a step 180. In the step 180, the above-described coarse adjustment of the irradiating positions of the light beams with respect to the main scanning direction is omitted, and only the fine adjustment of the irradiating positions of the light beams with respect to the main scanning direction and the adjustment of the irradiating positions of the light beams with respect to the subscanning direction are made. When the judgment in the step 156 is affirmative, the routine proceeds to a step 158 and there is a standby state until the image forming processing is completed.

When the executed image forming processing is completed, the judgment in the step 158 is affirmative, and the routine proceeds to the step 180. Similarly to the above case, only fine adjustment of the irradiating positions of the light beams with respect to the main scanning direction and adjustment of the irradiating positions of the light beams with respect to the subscanning direction are made. Thus, it is possible to shorten the time required to adjust the irradiating positions of the light beams. The above steps 152 to 158 correspond to the invention of claim 10.

In the above explanation, the adjustment of the irradiating positions of the light beams with respect to the main scanning direction is divided into two adjustments, which are the coarse adjustment and the fine adjustment, and is carried out. Further, the adjustment of the irradiating positions of the light beams with respect to the subscanning direction is carried out only once. However, the present invention is not limited to this case. For example, the adjustment of the irradiating positions may be carried out only onece for each of the main scanning direction and the subscanning direction of the light beams, or the adjustment of the irradiating positions of the light beams for each of the main scanning direction and the subscanning direction may be carried out with each being divided into the two adjustments of coarse adjustment and fine adjustment.

Figure 15A:
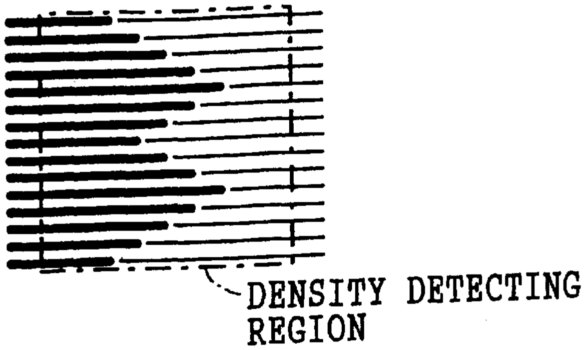
FIGS. 15A to 15C are plan views each showing another example of mark images for adjustment in the subscanning direction.
Figure 15B:
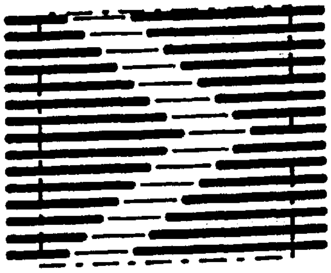
Figure 15C:
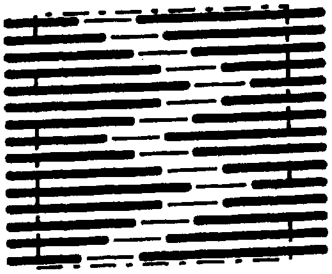
Figure 15C:
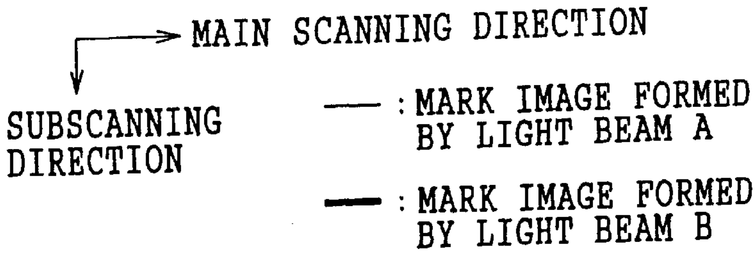

In the above explanation, the irradiating positions of the light beams with respect to the subscanning direction are adjusted by using the mark images for adjustment in the subscanning direction shown in FIGS. 13A to 13E. However, the present invention is not limited to this case. For example, the mark images may be formed as shown in FIG. 15A in which an envelope connecting end portions of respective bars is convex at two portions toward an optical scanning region side of the light beam A. The mark images may also be formed as shown in FIG. 15B in which a mark formed by one light beam (the light beam A in this case) is located between marks formed by the other light beam (the light beam B in this case). The mark images may also be formed as shown in FIG. 15C in which the mark images shown in FIG. 15A and the mark images shown in FIG. 15B are combined with each other.

In the above explanation, the time which has elapsed from the completion of the adjustment of the light beam irradiating positions is measured by the timer 38. When a predetermined time or more has passed from completion of the adjustment of the light beam irradiating positions, the light beam irradiating positions are again adjusted. However, the present invention is not limited to this case. For example, a temperature sensor (the temperature detecting means described in claim 11) for detecting a temperature within the image forming device 10 may be provided instead of the timer 38. In this case, as described in the parentheses in steps 152 and 154 in the flow chart of FIG. 7, the light beam irradiating positions may be again adjusted when the temperature within the image forming device 10 detected by the temperature sensor is fetched and has changed by a predetermined value (for example, about 3°C.) or more from the temperature at the time of completion of adjustment of the light beam irradiating positions. The above aspect corresponds to the invention of claim 11.

The light beam irradiating positions may be again adjusted when the timer 38 and the temperature sensor are respectively provided, and the elapsed time is monitored by the timer 38 and the change in temperature within the image forming device is monitored by the temperature sensor, and a predetermined time or more has passed or the temperature within the image forming device has changed by a predetermined value or more. In particular, in an image forming device having a high processing speed, changes in temperature and the like within the image forming device are generally large. Accordingly, it is effective to monitor each of the elapsed time and the change in temperature within the image forming device as mentioned above.

In the above explanation, the timing generating circuit 44 shifts the timing for starting the output of a synchronizing signal to the A-side line sync generating circuit 48 with respect to the timing for starting the output of a synchronizing signal to the B-side line sync generating circuit 50 in units of one line in accordance with commands from the main controller 40. Thus, the forming position of the mark image formed by the light beam A (the irradiating position of the light beam A) is shifted along the subscanning direction from the forming position of the mark image formed by the light beam B (the irradiating position of the light beam B). However, the present invention is not limited to this case, and the timing control circuit can be structured as shown in FIG. 16.

Figure 16:
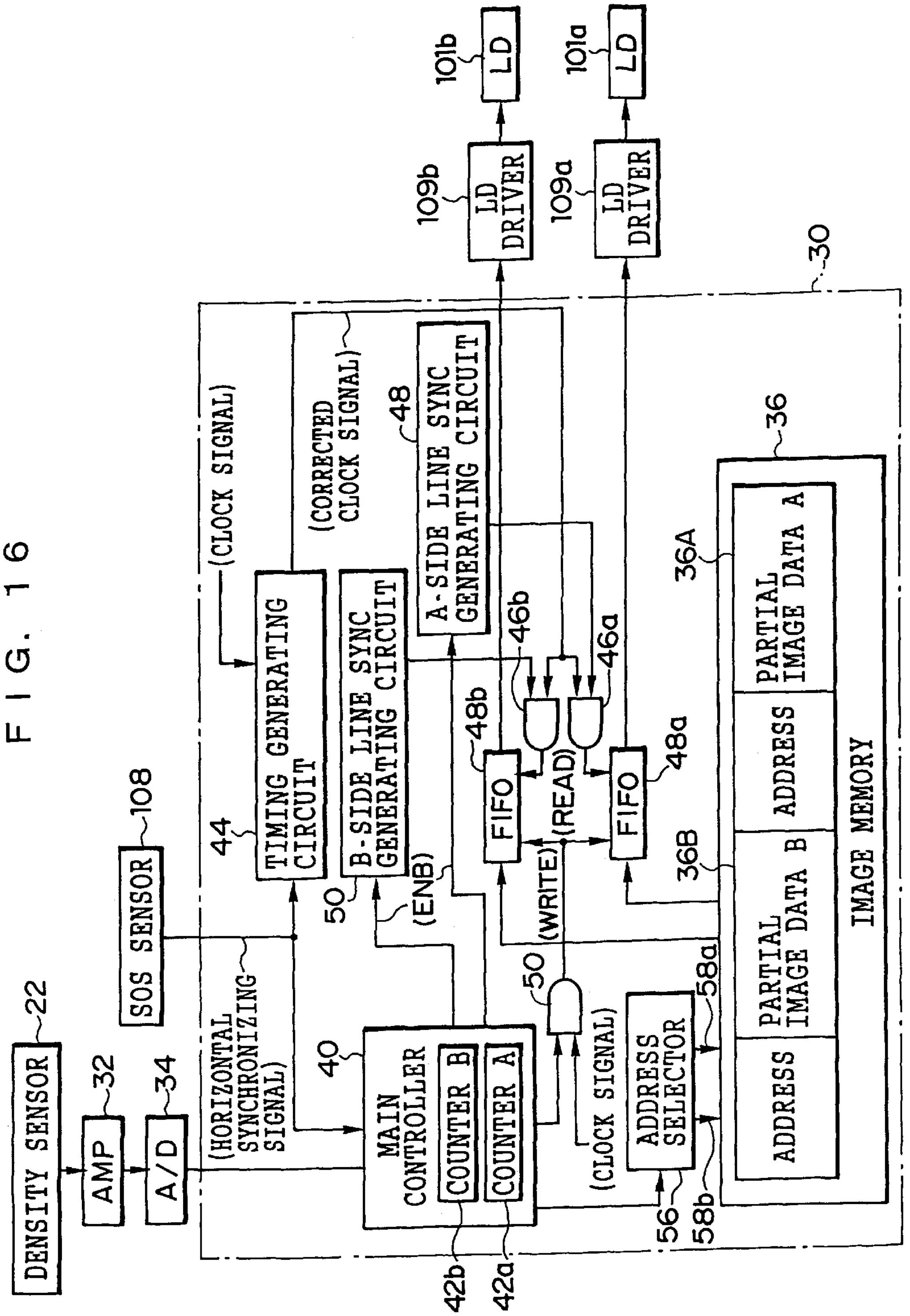
FIG. 16 is a block diagram showing another example of the structure of the control circuit for controlling the driving timing of LDs in particular in the control section.

Namely, in the timing control circuit shown in FIG. 16, no write timing control signal is inputted to the timing generating circuit 44, and the timing generating circuit 44 generates only a corrected clock signal. The image memory 36 has a memory area 36*a* for storing data of a partial image to be formed by the light beam A and a memory area 36*b* for storing data of a partial image to be formed by the light beam B (the memory means described in claim 9). The image memory 36 is connected to an address selector 56 through an address bus 58*a* for designating an address of data to be written to the FIFO memory 52*a*, and an address bus 58*b* for designating an address of data to be written to the FIFO memory 52*b*. The address selector 56 is connected to the main controller 40. This address selector 56 forms one portion of the control means described in claim 9.

When an image (including the mark image) is to be formed, the address selector 56 successively updates the address designated through the address bus 58*a* and the address designated through the address bus 58*b*, while the difference between these addresses is maintained constant. The address selector 56 then outputs in order data stored in the memory areas 36*a*, 36*b* to the corresponding FIFO memories 52*a*, 52*b*. The address difference for simultaneously reading data on the same main scanning line from the memory regions 36*a*, 36*b* is stored in the address selector 56 as an initial value of the address difference between the address designated through the address bus 58*a* and the address designated through the address bus 58*b*.

When the mark images are formed plural times and the irradiating positions of the light beams along the subscanning direction are adjusted, the above initial value is used as the address difference between the addresses designated through the address buses 58*a*, 58*b* at the time of forming the first mark image. However, in the formation of the second and subsequent mark images, the main controller 40 controls operation of the address selector 56 such that the address difference between addresses designated by the address selector 56 through the address buses 58*a*, 58*b* is sequentially changed in units of an address difference corresponding to an image data amount used in one scan of the light beam. This control corresponds to the control means described in claim 9.

Thus, plural mark images are formed on the peripheral surface of the photosensitive body drum 12 such that the forming position of the mark image for adjustment in the subscanning direction formed by the light beam A is offset by a unit which is one line in the subscanning direction from the forming position of the mark image for adjustment in the subscanning direction formed by the light beam B. When an image is actually formed on the recording sheet 26, a value at the time the positional relationship between the irradiating positions of the light beams A and B with respect to the subscanning direction is judged to be optimal(i.e., at the time the judgment in the step 194 is affirmative), is used as the address difference between addresses designated via the addresses buses 58*a*, 58*b*.

In the above explanation, mark data are stored in the image memory 36, and are read from the image memory 36 and used when the irradiating positions of the light beams are adjusted. However, the present invention is not limited to this case. In order form to the mark images on the peripheral surface of the photosensitive body drum 12, a circuit used exclusively for modulating the LDs 109*a*, 109*b* may be provided, and the mark images may be formed by this circuit when the irradiating positions of the light beams are adjusted. Thus, because the irradiating positions of the light beams can be adjusted in a short time, such a structure is particularly effective in an image forming device having a high processing speed.

In the above explanation, the resolution of the density detection by the density sensor 22 is improved by adjusting the gain of the density sensor 22 substantially in accordance with the density of the mark images formed on the peripheral surface of the photosensitive body drum 12. However, the present invention is not limited to this case. For example, the resolution of the detection of the density by the density sensor 22 may be improved by adjusting the electric potential of an electrostatic latent image by at least one of varying the in charging amount of the charger 14 and varying the irradiating light amounts of the light beams. Or, the resolution of the detection of the density by the density sensor 22 may be improved by adjusting the density of a toner image by changing the adhered amount of toner through controlling the development carried out by the developer 20. Or, the resolution of the detection of the density by the density sensor 22 may be improved by a combination of these structures. The above aspect corresponds to "the formation of a predetermined image is controlled such that a density value of the predetermined image within a predetermined region corresponds to a high sensitivity region of the detecting means" described in claim 3.

When the forming positions of the mark images formed by both light beams are offset from one another in the adjustment of the irradiating positions of the light beams, if the change in density within the density detecting region is small or the like, for example, the length of the density detecting region along the subscanning direction may be set to be long. Alternatively, plural density detecting regions may be provided, and mark images may be formed in accordance with each of the density detecting regions, and the irradiating positions of the light beams may be adjusted on the basis of a total value of densities within the respective density detecting regions.

Figure 1D:
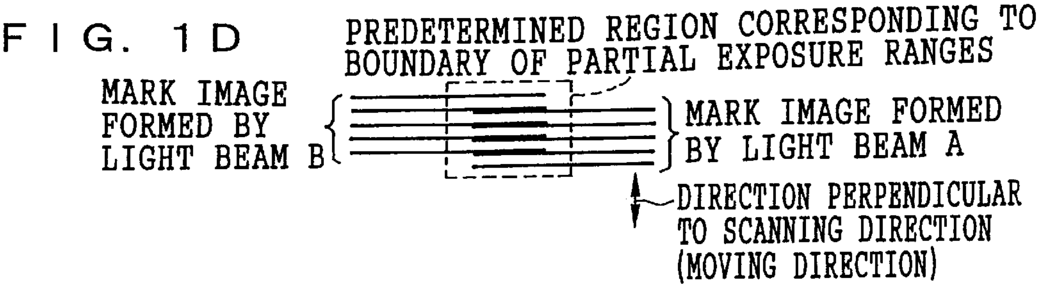
Figure 1E:
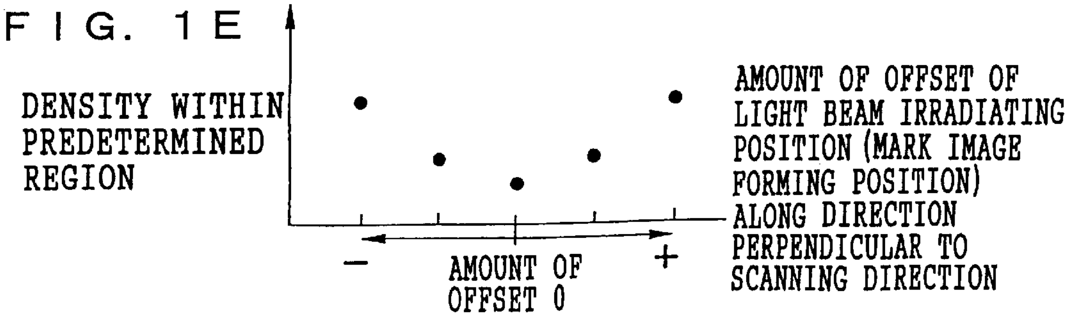

In the above explanation, the two light beams are both deflected by the single polygon mirror 104, and the offset in the irradiating positions with respect to the subscanning direction is corrected in units which are one main scan. However, the present invention is not limited to this case. For example, plural light beams may be respectively reflected by separate deflecting means. Thus, the offset in the irradiating positions with respect to the subscanning direction can be corrected by a unit smaller than one line by offsetting the timings of the main scans by the individual deflecting means. In such a case, for example, as shown in FIG. 1D, it is preferable to form the mark images such that the marks formed by both of the light beams are overlapped along the subscanning direction. Further, plural SOS sensors 108 may be provided in correspondence with the plural light beams.

In the above explanation, the density of a toner B3 image within the density detecting region is detected by the density sensor 22. However, the present invention is not limited to this case. An electric potential sensor (corresponding to the detecting means of the present invention, and more particularly, to the detecting means described in claim 5), which detects electric potential in an electric potential detecting region corresponding to the boundary of the partial exposure ranges and is similar to the density detecting region, may be provided at position B shown by a broken line in FIG. 2. In this case, the electric potential sensor detects the electric potential of an electrostatic latent image formed by irradiating the light beams A and B onto the peripheral surface of the photosensitive body drum 12. The electric potential detected by the electric potential sensor can be treated as a value similar to the density detected by the density sensor 22. For example, although it depends on the sensitivity characteristics of the electric potential sensor, the resolution of the detection of the electric potential by the electric potential sensor can be improved by adjusting the electric potential of the electrostatic latent image by changing a charging amount provided by the charger 14 or changing the irradiating light amounts of the light beams.

In the above explanation, an image is formed by simultaneously scanning the two light beams. However, the present invention is not limited to this case. For example, the present invention can be also applied to a case in which three light beams or more are simultaneously scanned.

What is claimed is:

1. An image forming device comprising a divisional light scanning device in which an exposure range on an image carrier is divided in advance, in accordance with plural light beams respectively emitted from plural light sources and respectively deflected by deflecting means, into plural partial exposure ranges along a scanning direction of the light beams on the image carrier, and each of the light beams is scanned on the image carrier such that an optical scanning range of each of the light beams includes a corresponding partial exposure range and ranges from a boundary of partial exposure ranges to a position spaced apart therefrom by a predetermined length along the scanning direction, the image forming device being structured such that an image is formed on the image carrier by scanning each of the light beams on the image carrier and exposing each of the partial exposure ranges on the image carrier by the corresponding light beam, and the image forming device further comprising:

image forming control means' for forming a predetermined image on the image carrier by modulating each of the light beams;

detecting means for detecting a density of the predetermined image within a predetermined region corresponding to the boundary of the partial exposure ranges, or a physical amount relating to the density; and control means for, on the basis of the density or the physical amount relating to the density detected by the detecting means, judging a positional relationship between irradiating positions at a boundary of partial exposure ranges of a pair of light beams which expose adjacent partial exposure ranges, and controlling the positional relationship such that the positional relationship becomes an desired positional relationship.

2. An image forming device according to claim 1, wherein the image forming control means forms, as the predetermined image within the predetermined region, a mark image alternately having low density portions and high density portions along the scanning direction or a direction perpendicular to the scanning direction.

3. An image forming device according to claim 1, wherein the image forming control means controls sensitivity of the detecting means or the formation of the predetermined image such that the density of the predetermined image within the predetermined region or a value of the physical amount relating to the density corresponds to a high sensitivity region of the detecting means.

4. An image forming device according to claim 1, further comprising:

charging means for charging the image carrier; and developing means for developing an electrostatic latent image formed on the image carrier by scanning each of the plural light beams on the image carrier, wherein said detecting means detects, as the density of the predetermined image, a density, within said predetermined region, of a toner image formed on the image carrier by the developing means developing the electrostatic latent image of the predetermined image.

5. An image forming device according to claim 1, further comprising charging means for charging the image carrier, wherein said detecting means detects, as the physical amount relating to the density of the predetermined image, an electric potential, within said predetermined region, of an electrostatic latent image of the predetermined image formed on the image carried by each of the plural light beams being scanned on the image.

6. An image forming device according to claim 1, wherein, for a pair of light beams which expose adjacent partial exposure ranges, the control means changes the positional relationship, along the scanning direction or a direction perpendicular to the scanning direction, between irradiating positions of the light beams at the boundary of the partial exposure ranges, and on the basis of a change in the density or in the physical amount relating to the density detected by the detecting means at a time the positional relationship is changed, said control means judges whether the positional relationship, along the scanning direction or the direction perpendicular to the scanning direction, between the irradiating positions of the light beams at the boundary of the partial exposure ranges is the desired positional relationship.

7. An image forming device according to claim 6, wherein, for a pair of light beams which expose adjacent partial exposure ranges, the control means changes the positional relationship, along the scanning direction, between the irradiating positions of the light beams at the boundary of the partial exposure ranges by relatively changing the timing for starting or ending modulation of the light beams for forming an image in each scan.

8. An image forming device according to claim 6, wherein, for a pair of light beams which expose adjacent partial exposure ranges, the control means changes the positional relationship, along the direction perpendicular to the scanning direction, between the irradiating positions of the light beams at the boundary of the partial exposure ranges by relatively changing, by a unit which is the time required for one scan of the light beams, the timing for starting or ending modulation of the light beams for forming an image.

9. An image forming device according to claim 6, further comprising storing means for storing image data expressing an image to be formed, with the image data expressing the image to be formed being divided into partial image data each expressing a partial image to be formed in each of the partial exposure ranges, wherein the control means reads the partial image data corresponding to each of the light sources from the storing means with respect to each of the plural light sources, and controls driving of each of the light sources such that the light beams are modulated in accordance with the read partial image data, and, for a pair of light beams which expose adjacent partial exposure ranges, changes the positional relationship, along the direction perpendicular to the scanning direction, between the irradiating positions of the light beams at the boundary of the partial exposure ranges by relatively changing, by a unit which is an address difference corresponding to an image data amount used in one scan of the light beams, a read address at the time of reading of the partial image data corresponding to both of the light beams.

10. An image forming device according to claim 1, further comprising timing means for measuring time, wherein each time it is detected that a predetermined time has passed on the basis of the time measured by the timing means, the image forming control means forms the predetermined image on the image carrier, and the detecting means detects the density or the physical amount relating to the density, and the control means controls the positional relationship between the irradiating positions of the light beams at the boundary of the partial exposure ranges such that the positional relationship becomes the desired positional relationship.

11. An image forming device according to claim 1, further comprising temperature detecting means for detecting temperature, wherein after a predetermined temperature change has occurred, on the basis of temperature detected by the temperature detecting means, the image forming control means forms the predetermined image on the image carrier, the detecting means detects the density or the physical amount relating to the density, and the control means controls the positional relationship of the irradiating positions of the light beams at the boundary of the partial exposure ranges such that the positional relationship becomes the desired positional relationship.

12. An image forming device comprising a divisional light scanning device in which an exposure range on an image carrier is divided in advance, in accordance with plural light beams respectively emitted from plural light sources and respectively deflected by a deflector, into plural partial exposure ranges along a scanning direction of the light beams on the image carrier, and each of the light beams is scanned on the image carrier such that an optical scanning range of each of the light beams includes a corresponding partial exposure range and ranges from a boundary of partial exposure ranges to a position spaced apart therefrom by a predetermined length along the scanning direction, the image forming device being structured such that an image is formed on the image carrier by scanning each of the light beams on the image carrier and exposing each of the partial exposure ranges on the image carrier by the corresponding light beam, and the image forming device further comprising:

image forming control means for forming a predetermined image on the image carrier by modulating each of the light beams;

a detecting sensor for detecting a density of the predetermined image within a predetermined region corresponding to the boundary of the partial exposure ranges, or a physical amount relating to the density; and control means for, on the basis of the density or the physical amount relating to the density detected by the detecting sensor, judging the positional relationship between irradiating positions at a boundary of partial exposure ranges of a pair of light beams which expose adjacent partial exposure ranges, and controlling the positional relationship such that the positional relationship becomes an desired positional relationship.

13. An image forming device according to claim 12, wherein the image forming control means forms, as the predetermined image within the predetermined region, a mark image alternately having low density portions and high density portions along the scanning direction or a direction perpendicular to the scanning direction.

14. An image forming device according to claim 12, wherein the image forming control means controls sensitivity of the detecting sensor or the formation of the predetermined image such that the density of the predetermined image within the predetermined region or a value of the physical amount relating to the density corresponds to a high sensitivity area of the detecting sensor.

15. An image forming device according to claim 12, further comprising:

a charger for charging the image carrier; and a developing device for developing an electrostatic latent image formed on the image carrier by scanning each of the plural light beams on the image carrier, wherein said detecting sensor detects, as the density of the predetermined image, a density, within the predetermined region, of a toner image formed on the image carrier by the developing device developing the electrostatic latent image of the predetermined image.

16. An image forming device according to claim 12, further comprising a charger for charging the image carrier, wherein said detecting sensor detects, as the physical amount relating to the density of the predetermined image, an electric potential, within said predetermined region, of an electrostatic latent image of the predetermined image formed on the image carrier by each of the plural light beams being scanned on the image carrier.

17. An image forming device according to claim 12, wherein, for a pair of light beams which expose adjacent partial exposure ranges, the control means changes the positional relationship, along the scanning direction or a direction perpendicular to the scanning direction, between the irradiating positions of the light beams at the boundary of the partial exposure ranges, and on the basis of a change in the density or in the physical amount relating to the density detected by the detecting sensor at a time the positional relationship is changed, said control means judges whether the positional relationship, along the scanning direction or the direction perpendicular to the scanning direction, between the irradiating positions of the light beams at the boundary of the partial exposure ranges is the desired positional relationship.

18. An image forming device according to claim 17, wherein, for a pair of light beams which expose the adjacent partial exposure ranges, the control means changes the positional relationship, along the scanning direction, between the irradiating positions of the light beams at the boundary of the partial exposure ranges by relatively changing the timing for starting or ending modulation of the light beams for forming an image in each scan.

19. An image forming device according to claim 17, wherein, for a pair of light beams which expose adjacent partial exposure ranges, the control means changes the positional relationship, along the direction perpendicular to the scanning direction, between the irradiating positions of the light beams at the boundary of the partial exposure ranges by relatively changing by a unit which is the time required for one scan of the light beams, the timing for starting or ending modulation of the light beams for forming an image.

20. An image forming device according to claim 17, further comprising a memory for storing image data expressing an image to be formed, with an image data expressing the image to be formed being divided into partial image data each expressing a partial image to be formed in each of the partial exposure ranges, wherein the control means reads the partial image data corresponding to each of the light sources from the memory with respect to each of the plural light sources, and controls driving of each of the light sources such that the light beams are modulated in accordance with the read partial image data, and, for a pair of light beams which expose adjacent partial exposure ranges, changes the positional relationship, along the direction perpendicular to the scanning direction, between the irradiating positions of the light beams at the boundary of the partial exposure ranges.

21. An image forming device according to claim 12, wherein the image forming device further comprises a timer for measuring time, wherein each time it is detected that a predetermined time has passed on the basis of the time measured by the timer, the image forming control means forms the predetermined image on the image carrier, and the detecting sensor detects the density or the physical amount relating to the density, and the control means controls the positional relationship between the irradiating positions of the light beams at the boundary of the partial exposure ranges such that the positional relationship becomes the desired positional relationship.

22. An image forming device according to claim 12, further comprising a temperature detecting sensor for detecting temperature, wherein after it is detected on the basis of temperature detected by the temperature detecting sensor that a predetermined temperature change has occurred, the image forming control means forms the predetermined image on the image carrier, the detecting sensor detects the density or the physical amount relating to the density, and the control means controls the positional relationship between the irradiating positions of the light beams at the boundary of the partial exposure ranges such that the positional relationship becomes the desired positional relationship.

23. A method of controlling a divisional light scanning device, comprising the steps of:

dividing an exposure range on an image carrier in advance, in accordance with plural light beams respectively emitted from plural light sources and respectively deflected into plural partial exposure ranges along a scanning direction of the light beams on an image carrier;

scanning each of the light beams on the image carrier such that an optical scanning range of the light beams includes a corresponding partial exposure range and extends from a boundary of partial exposure ranges to a position spaced apart therefrom by a predetermined length along the scanning direction;

forming a predetermined image on the image carrier by modulating each of the light beams;

detecting a density of the predetermined image within a predetermined region corresponding to the boundary of the partial exposure ranges, or a physical amount relating to the density; and determining the positional relationship between irradiating positions atthe boundary of the partial exposure ranges of a pair of light beams which expose adjacent partial exposure regions on the basis of the detected density or the detected physical amount relating to the density, and controlling the positional relationship to achieve a desired positional relationship.

* * * * *